US012741462B2

(12) United States Patent
Miura et al.

(10) Patent No.: US 12,741,462 B2
(45) Date of Patent: Sep. 22, 2026

(54) LIQUID EJECTION HEAD SUBSTRATE, LIQUID EJECTION HEAD, AND LIQUID EJECTION APPARATUS

(71) Applicant: CANON KABUSHIKI KAISHA, Tokyo (JP)

(72) Inventors: Yosuke Miura, Tokyo (JP); Yuzuru Ishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 18/896,297

(22) Filed: Sep. 25, 2024

(65) Prior Publication Data

US 2025/0100278 A1 Mar. 27, 2025

(30) Foreign Application Priority Data

Sep. 27, 2023 (JP) ................................ 2023-164214

(51) Int. Cl.
*B41J 2/14* (2006.01)

(52) U.S. Cl.
CPC ......... *B41J 2/1408* (2013.01); *B41J 2/14153* (2013.01); *B41J 2002/14185* (2013.01)

(58) Field of Classification Search
CPC .................. B41J 2/1408; B41J 2/14153; B41J 2002/14185; B41J 2202/12
See application file for complete search history.

(56) References Cited

U.S. PATENT DOCUMENTS

| | | | | |
|---|---|---|---|---|
| 9,731,504 | B2 | 8/2017 | Sekine et al. | |
| 11,712,891 | B2 * | 8/2023 | Hamada | B41J 2/14145 347/40 |
| 2014/0300660 | A1 * | 10/2014 | Hirayama | B41J 2/072 347/17 |
| 2016/0297199 | A1 | 10/2016 | Sekine et al. | |
| 2019/0001677 | A1 * | 1/2019 | Kasai | B41J 2/0458 |
| 2020/0122459 | A1 * | 4/2020 | Shimotsusa | B41J 2/04501 |
| 2024/0375397 | A1 * | 11/2024 | Sato | B41J 2/1408 |
| 2024/0375398 | A1 | 11/2024 | Miura et al. | |

FOREIGN PATENT DOCUMENTS

JP 2016-198936 A 12/2016

* cited by examiner

*Primary Examiner* — Sharon Polk
(74) *Attorney, Agent, or Firm* — VENABLE LLP

(57) ABSTRACT

A technology capable of efficiently dissipating heat in a printing element substrate with a temperature adjustment heating element mounted thereon is to be provided. A liquid ejection head substrate capable of ejecting liquid using energy generated by an energy generating element includes: a base; a first heat transfer layer configured to be installed below the energy generating element, and formed by being laminated on the base via an insulating layer; a temperature adjustment heating element configured to be capable of adjusting the temperatures of the liquid and the liquid ejection head substrate; and a first heat transfer member configured to connect the first heat transfer layer and the base, wherein the first heat transfer member is installed between adjacent ones of a plurality of the energy generating elements and between the energy generating element and the temperature adjustment heating element.

19 Claims, 15 Drawing Sheets

LIQUID EJECTION HEAD SUBSTRATE, LIQUID EJECTION HEAD, AND LIQUID EJECTION APPARATUS

BACKGROUND OF THE INVENTION

Field of the Invention

The present invention relates to a liquid ejection head substrate, a liquid ejection head, and a liquid ejection apparatus.

Description of the Related Art

In a printing element substrate mounted on a print head that ejects ink by an inkjet system, ink is ejected from nozzles using, for example, thermal energy generated by electrothermal conversion elements serving as printing elements. In recent years, in order to improve the functionality of printing element substrates, for example, a temperature detection element for detecting the temperature of a printing element being driven, a temperature adjustment heating element for adjusting the temperature of the ink and the printing element substrates, etc., have been installed on printing element substrates, and the number of printing elements mounted has been increased.

For this reason, on printing element substrates, the members mounted are arranged at high density, and new heat sources such as the temperature adjustment heating element are added, and thus efficient heat dissipation is required. Japanese Patent Laid-Open No. 2016-198936 discloses a technology for efficiently dissipating heat generated by a printing element.

However, the technology disclosed in Japanese Patent Laid-Open No. 2016-198936 does not take into consideration the placement of temperature detection elements, temperature adjustment heating elements, etc., and thus it has been difficult to obtain a sufficient heat dissipation effect in a highly functional printing element substrate equipped with these elements.

SUMMARY OF THE INVENTION

The present invention has been made in view of the above-mentioned issues, and provides a technology capable of efficiently dissipating heat in a printing element substrate with a temperature adjustment heating element mounted thereon.

A liquid ejection head substrate capable of ejecting liquid using energy generated by an energy generating element includes: a base; a first heat transfer layer configured to be installed below the energy generating element, and formed by being laminated on the base via an insulating layer; a temperature adjustment heating element configured to be capable of adjusting the temperatures of the liquid and the liquid ejection head substrate; and a first heat transfer member configured to connect the first heat transfer layer and the base, wherein the first heat transfer member is installed between adjacent ones of a plurality of the energy generating elements and between the energy generating element and the temperature adjustment heating element.

According to the present invention, it becomes possible to efficiently dissipate heat in a printing element substrate with a temperature adjustment heating element mounted thereon.

Further features of the present invention will become apparent from the following description of exemplary embodiments with reference to the attached drawings.

DESCRIPTION OF THE EMBODIMENTS

Hereinafter, an example of embodiments of the liquid ejection head substrate, liquid ejection head, and liquid ejection apparatus is explained in detail with reference to the accompanying drawings. Note that the following embodiments are not intended to limit the present invention, and every combination of the characteristics explained in the present embodiments is not necessarily essential to the solution provided in the present invention. Further, the positions, shapes, etc., of the constituent elements described in the present embodiments are merely examples and are not intended to limit the range of this invention thereto.

In the present specification, as a liquid ejection apparatus configured to eject liquid with a liquid ejection head including a liquid ejection head substrate, a printing apparatus configured to eject ink with a print head including a printing element substrate is taken as an example for the explanation.

(Printing Apparatus)

Figure 1:
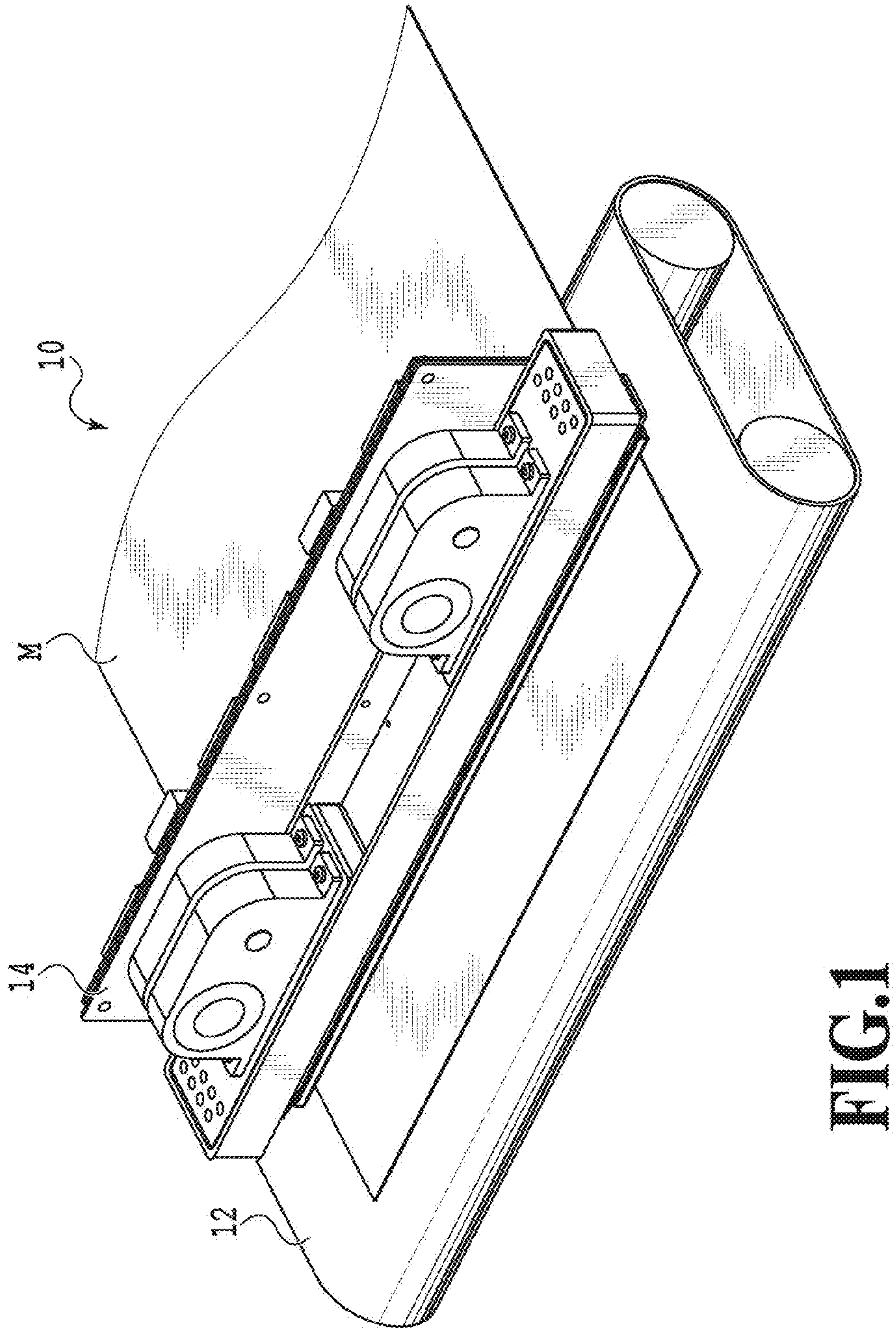
FIG. 1 is a schematic configuration diagram of a printing apparatus.

FIG. 1 is a schematic configuration diagram of the printing apparatus. The printing apparatus 10 in FIG. 1 includes the conveyance part 12 that conveys the print medium M, and the print head 14 that ejects ink onto the print medium M to perform printing. The printing apparatus 10 is a line-type printing apparatus that performs continuous printing in one pass while conveying a plurality of print media M in a continuous or intermittent manner. Note that the print medium M is not limited to a cut sheet, but may be a continuous roll paper.

The print head 14 is a line-type print head extending in a direction intersecting (orthogonally in the present embodiment) the conveyance direction of the print medium M. In the present embodiment, the print head 14 is configured with the ability of ejecting four types of ink, i.e., cyan (C) ink, magenta (M) ink, yellow (Y) ink, and black (Bk) ink. That is, the printing apparatus 10 is configured to be capable of printing in full color using these inks.

The print head 14 is fluidly connected to the supply unit 224 (described later), the main tank 202 (described later), and the buffer tank 204 (described later). In the printing apparatus 10, the print head 14 forms an ink circulation path (described later) together with the supply unit 224, the buffer tank 204, etc. Further, the printing apparatus 10 includes an electric control part (not illustrated in the drawings) that transmits electric power, ejection control signals, and the like to the print head 14.

(Circulation Path)

The printing apparatus 10 includes a circulation path that supplies ink to the print head 14 and collects the ink supplied to the print head 14, so as to be capable of circulating the ink to be supplied to the print head 14. In the present embodiment, it is possible to form two circulation paths. Hereinafter, a detailed explanation is given of the two circulation paths applicable to the present embodiment.

<First Circulation Path>

Figure 2A:
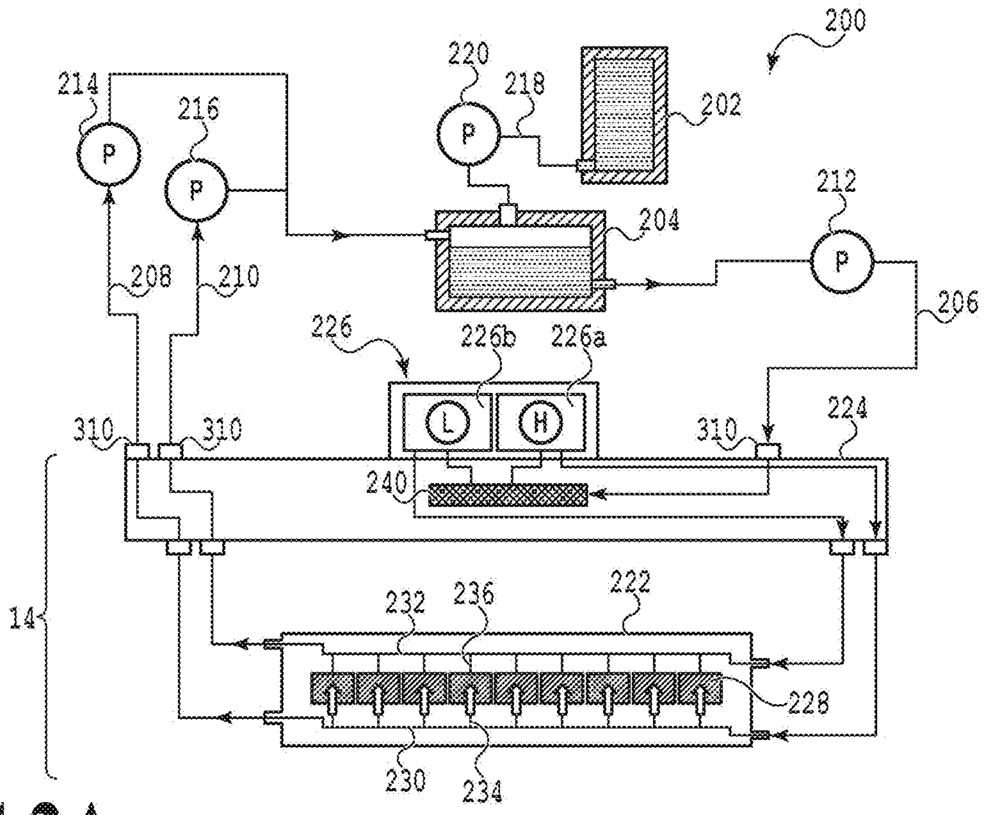
FIG. 2A and FIG. 2B are schematic configuration diagrams of circulation paths.

First, an explanation is given about the first circulation path, which is one form of the circulation paths applicable to the printing apparatus 10 according to the present embodiment. FIG. 2A is a diagram illustrating the first circulation path, which is one form of the circulation paths applicable to the printing apparatus 10 according to the present embodiment. Note that FIG. 2A illustrates a circulation path for one ink. Since the printing apparatus 10 is configured with the ability of ejecting four different inks, the circulation path illustrated in FIG. 2A is provided for each type of ink.

In the printing apparatus 10, the print head 14 and the buffer tank 204 capable of storing the ink supplied from the main tank 202 are connected via the channels 206, 208, and 210 to form the first circulation path 200. The first circulation path 200 is configured to circulate the ink between the buffer tank 204 and the print head 14 by the driving of the three pumps 212, 214, and 216. Specifically, the pump 212 is installed in the channel 206, so that the ink stored in the buffer tank 204 is supplied to the print head 14 by the driving of the pump 212. Further, the pump 214 (the high pressure side) is installed in the channel 208, and the pump 216 (the low pressure side) is installed in the channel 210. By the driving of these pumps 214 and 216, the ink is suctioned from the print head 14, and the suctioned ink is transferred to the buffer tank 204.

The buffer tank 204 includes an atmosphere communication opening (not illustrated in the drawings) that allows communication between the inside and the outside, and thus is configured with the ability of discharging air bubbles generated in the stored ink to the outside. Further, the buffer tank 204 is connected to the main tank 202 via the channel 218. The pump 220 is installed in the channel 218. In the printing apparatus 10, for example, if ink is consumed in the print head 14 and the ink stored in the buffer tank 204 reaches a predetermined amount or lower, the pump 220 is driven so that the ink stored in the main tank 202 is supplied to the buffer tank 204. In the print head 14, ink is consumed at the time of ejecting (discharging) ink from the nozzles of the print head 14, for example, at the time of ejecting ink that contributes to printing, at the time of ejecting ink that does not contribute to printing, etc.

It is preferable that the pumps 214 and 216 are positive displacement pumps with a constant volumetric liquid transfer capacity. Specifically, examples of a positive displacement pump include a tube pump, a gear pump, a diaphragm pump, a syringe pump, etc. Alternatively, instead of using such a pump, a constant flow rate may be ensured, for example, by placing a general constant flow valve or relief valve at the pump outlets. Further, the channel 208, where the pump 214 is installed, is connected to the common supply channel 230 (described later) in the print head 14, and the channel 210, where the pump 216 is installed, is connected to the common collecting channel 232 (described later) in the print head 14.

At the time the print head 14 is driven, a certain amount of ink is suctioned from the common supply channel 230 and the common collecting channel 232 by the pumps 214 and 216. The flow rate at the time of the suctioning is set to a level at which the temperature difference between the printing element substrates 228 (described later) in the print head 14 does not affect the printing quality. Note that, if the flow rate is set too high, the negative pressure difference in each printing element substrate 228 becomes too large due to the influence of pressure drop in the channels within the ejection unit 222, resulting in density unevenness of images. For this reason, the flow rate is set taking into consideration the temperature difference and negative pressure difference between the printing element substrates 228.

The print head 14 includes the ejection unit 222 that ejects ink, and the supply unit 224 that supplies ink to the ejection unit 222 and collects the ink that flows out from the ejection unit 222.

In the supply unit 224, the ink supplied via the channel 206 is supplied to the ejection unit 222 via the negative pressure control unit 226. The negative pressure control unit 226 operates so that, even in a case where the flow rate in the circulation path fluctuates due to a change in print duty during printing, the pressure fluctuation on the downstream side of the negative pressure control unit 226 (i.e., the ejection unit 222 side) remains within a certain range. The pressure fluctuation is, for example, kept within a certain range centered on a preset pressure.

The negative pressure control unit 226 includes the two negative pressure adjustment mechanisms **226*a* and 226*b*. The negative pressure adjustment mechanisms 226*a* and 226*b* may be any mechanisms that can control the pressure on the downstream side of itself to fluctuate within a certain range centered on a desired set pressure. Of the negative pressure adjustment mechanisms 226*a* and 226*b*, the negative pressure adjustment mechanism 226*a* which is the relatively high pressure setting side is connected to the common supply channel 230 of the ejection unit 222 via the supply unit 224. Further, the negative pressure adjustment mechanism 226*b* which is the relatively low pressure setting side is connected to the common collecting channel 232 of the ejection unit 222 via the supply unit 224**.

As an example of the negative pressure adjustment mechanisms **226*a* and 226*b*, a configuration similar to what is termed as a depressurizing regulator can be adopted. In a case of using a depressurizing regulator, a configuration in which the pump 212 pressurizes the upstream side of the negative pressure control unit 226 via the supply unit 224 is preferable. With this configuration, the influence of the water head difference between the buffer tank 204 and the print head 14 can be suppressed, and the degree of freedom in the layout of the buffer tank 204 of the printing apparatus 10** can be increased.

The pump 212 may be any pump with a pump head pressure equivalent to or greater than a certain pressure within the range of the ink circulation flow rate used at the time of driving the print head 14, and may be a turbo pump, a positive displacement pump, etc. Specifically, a diaphragm pump or the like can be used as the pump 212. Further, instead of the pump 212, for example, a water head tank placed with a certain water head difference compared to the negative pressure control unit 226 may also be used.

The ejection unit 222 has an array of a plurality of printing element substrates 228 capable of ejecting ink. Further, in the ejection unit 222, the common supply channel 230 for supplying the ink supplied from the supply unit 224 and the common collecting channel 232 for flowing out the supplied ink to the supply unit 224 extend along the array direction of the printing element substrates 228. The common supply channel 230 is connected to the respective printing element substrates 228 via the individual supply channels 234. Further, the common collecting channel 232 is connected to the respective printing element substrates 228 via the individual collecting channels 236.

Accordingly, the common supply channel 230 and the common collecting channel 232 communicate with each other via the individual supply channels 234, the printing element substrates 228, and the individual collecting channels 236. Further, the common supply channel 230 is connected to the negative pressure adjustment mechanism **226*a*, so as to be maintained at a relatively high pressure, and the common collecting channel 232 is connected to the negative pressure adjustment mechanism 226*b*, so as to be maintained at a relatively low pressure, resulting in a pressure difference between the two channels. Therefore, part of the ink supplied to the common supply channel 230 flows into the common collecting channel 232 via the individual supply channels 234, the printing element substrates 228, and the individual collecting channels 236**.

With this configuration, an ink flow is generated in the ejection unit 222 so that ink flows in each of the common supply channel 230 and the common collecting channel 232 and part of the ink passes through each printing element substrate 228. Therefore, the heat generated in each printing element substrate 228 is discharged to the outside of the printing element substrates 228 by the ink flowing from the common supply channel 230 toward the common collecting channel 232. Further, during printing performed by the print head 14, ink flows can be generated even in the nozzles and pressure chambers that are not ejecting ink for printing. This makes it possible to suppress thickening of the ink in the nozzles and pressure chambers, and also makes it possible to discharge thickened ink and foreign substances in the ink from the printing element substrates 228 to the outside of the printing element substrates 228, enabling high-speed and high-quality printing.

<Second Circulation Path>

Figure 2B:
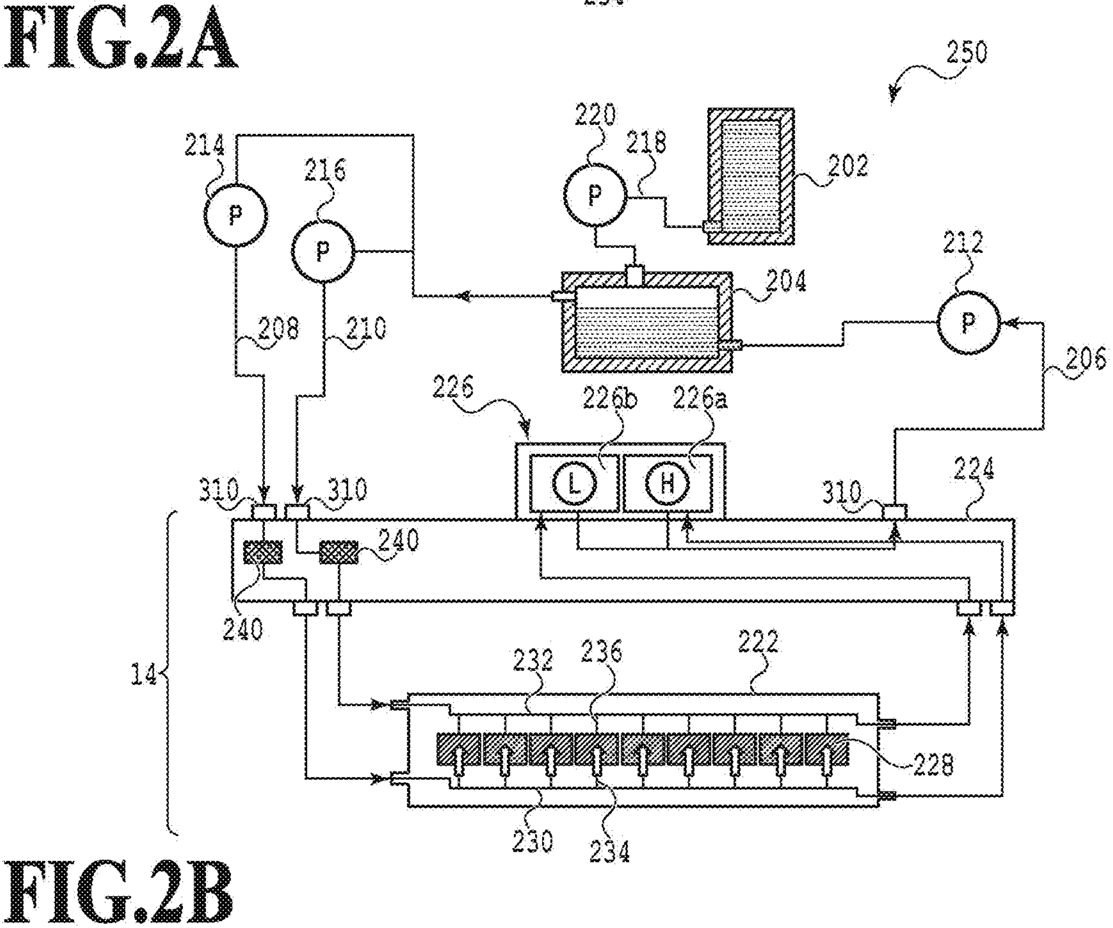

Next, an explanation is given about the second circulation path, which is one form of the circulation paths applicable to the printing apparatus 10 according to the present embodiment. FIG. 2B is a diagram illustrating the second circulation path, which is one form of the circulation paths applicable to the printing apparatus 10 according to the present embodiment. Note that FIG. 2B illustrates a circulation path for one ink. Since the printing apparatus 10 is configured with the ability of ejecting four different inks, the circulation path illustrated in FIG. 2B is provided for each type of ink. Hereinafter, an explanation is given about the main differences from the first circulation path 200.

First, in the second circulation path 250, ink is supplied to the print head 14 via the channels 208 and 210 by the driving of the pumps 214 and 216. Further, by the driving of the pump 212, ink is suctioned from the print head 14 via the channel 206, and the suctioned ink is transferred to the buffer tank 204. Furthermore, the negative pressure control unit 226 is placed on the downstream side of the print head 14. Both of the negative pressure adjustment mechanisms **226*a* and 226*b* that constitute the negative pressure control unit 226 have a mechanism that controls the pressure on the upstream side of the negative pressure control unit 226** to fluctuate within a certain range centered on a desired set pressure (a mechanism that functions in the same way as what is termed as a "back pressure regulator").

The negative pressure control unit 226 in the second circulation path 250 operates so that, even in a case where the flow rate fluctuates due to a change in print duty during printing performed by the print head 14, the pressure fluctuation on the upstream side of itself (i.e., the ejection unit 222 side) remains within a certain range. The pressure fluctuation is, for example, kept within a certain range centered on a preset pressure. Furthermore, it is preferable that the pump 212 pressurizes the downstream side of the negative pressure control unit 226 via the supply unit 224. By applying pressure in this manner, the influence of the water head pressure of the buffer tank 204 on the print head 14 can be suppressed. Therefore, the degree of freedom in the layout of the buffer tank 204 in the printing apparatus 10 can be increased. Note that, instead of the pump 212, for example, a water head tank placed with a predetermined water head difference compared to the negative pressure control unit 226 may also be used.

As with the first circulation path 200, the negative pressure control unit 226 in the second circulation path 250 includes the two negative pressure adjustment mechanisms **226*a* and 226*b* to which different control pressures are set. Of the two negative pressure adjustment mechanisms 226*a* and 226*b*, the negative pressure adjustment mechanism 226*a* which is the relatively high pressure setting side is connected to the common supply channel 230 of the ejection unit 222 via the supply unit 224. Further, the negative pressure adjustment mechanism 226*b* which is the relatively low pressure setting side is connected to the common collecting channel 232 of the ejection unit 222 via the supply unit 224. The two negative pressure adjustment mechanisms 226*a* and 226*b* make the pressure in the common supply channel 230 relatively higher than the pressure in the common collecting channel 232. Therefore, part of the ink supplied to the common supply channel 230 flows into the common collecting channel 232 via the individual supply channels 234, the printing element substrates 228, and the individual collecting channels 236**.

With this configuration, in the second circulation path 250, an ink flow similar to that of the first circulation path 200 is generated in the ejection unit 222, but two advantages differing from the first circulation path 200 can be obtained. The first advantage is that, in the second circulation path 250, since the negative pressure control unit 226 is placed on the downstream side of the print head 14, there is little concern that dust or foreign substances generated in the negative pressure control unit 226 will flow into the print head 14. The second advantage is that the maximum value of flow rate required for the supply from the buffer tank 204 to the print head 14 in the second circulation path 250 can be smaller than that in the first circulation path 200.

Specifically, assume that the sum of the flow rates in the common supply channel 230 and the common collecting channel 232 during circulation at the time of standby for printing is A. The value of A is defined as the minimum flow rate required to bring the temperature difference in the ejection unit 222 within a desired range in a case of adjusting the temperature of the print head 14 during standby for printing. Further, the ejection flow rate in a case of ejecting ink from all the nozzles of the ejection unit 222 (hereinafter referred to as "during full ejection") is defined as F.

In this case, in the first circulation path 200, since the set flow rate of the pumps 214 and 216 is A, the maximum value of ink supply amount required for the print head 14 during full ejection is A+F. On the other hand, in the second circulation path 250, the ink supply amount required for the print head 14 during standby for printing is A. Furthermore, the ink supply amount required for the print head 14 during full ejection is F. Therefore, in the second circulation path 250, the total value of the set flow rates of the pumps 214 and 216, i.e., the maximum value of required supply amount, is the larger value of A or F.

Therefore, as long as the ejection unit 222 with the same configuration is used, the maximum value of required supply amount in the second circulation path 250 (A or F) will always be smaller than the maximum value of required supply amount in the first circulation path 200 (A+F). Therefore, in the second circulation path 250, the degree of freedom in selecting the pumps to be used is improved. This makes it possible, for example, to use a low-cost pump with a simple configuration and to reduce the load on a cooler (not illustrated in the drawings) installed in a channel on the main body side, thereby suppressing manufacturing costs. In a line type print head, the above-mentioned value of A or F is relatively large. Therefore, the longer the line head is in the direction intersecting the conveyance direction of the print medium, the more the advantages of the second circulation path 250 can be enjoyed.

Note that the first circulation path 200 also has advantages. Specifically, in the second circulation path 250, the flow rate in the ejection unit 222 is at its maximum during standby for printing, and thus, the lower the print duty, the higher negative pressure applied to each nozzle. For this reason, particularly in a case where the channel width (the channel diameter) of the common supply channel 230 and the common collecting channel 232 is reduced so that the head width (the length in the transverse direction of the print head 14) is reduced, a high negative pressure is applied to the nozzles in low-duty images in which unevenness is easily visible. Furthermore, application of such a high negative pressure may increase the influence of satellite droplets. On the other hand, in the first circulation path 200, since the timing where a high negative pressure is applied to the nozzles is during high-duty image formation, satellite droplets, if generated, are difficult to be visually perceived, and thus there is little influence on the printed images. Therefore, in the printing apparatus 10, a preferable circulation channel is selected in consideration of the specifications of the print head 14 and the printing apparatus 10 (such as the ejection flow rate F, the minimum circulation flow rate A, and the channel resistance within the print head).

(Print Head)

Figure 3A:
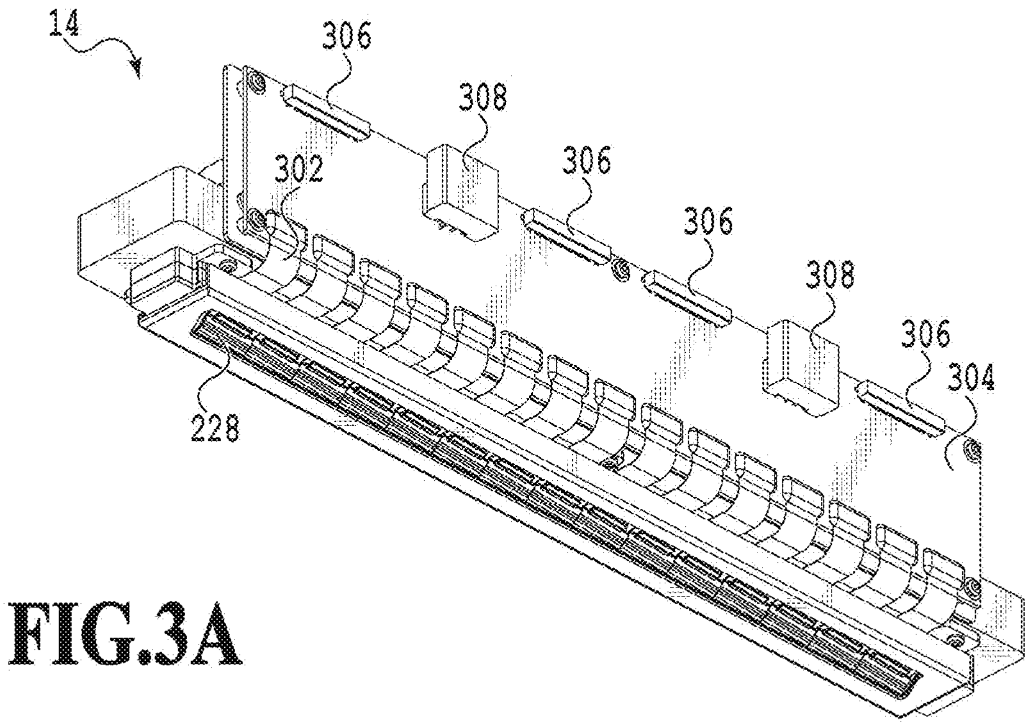
FIG. 3A and FIG. 3B are perspective configuration diagrams of a print head.
Figure 3B:
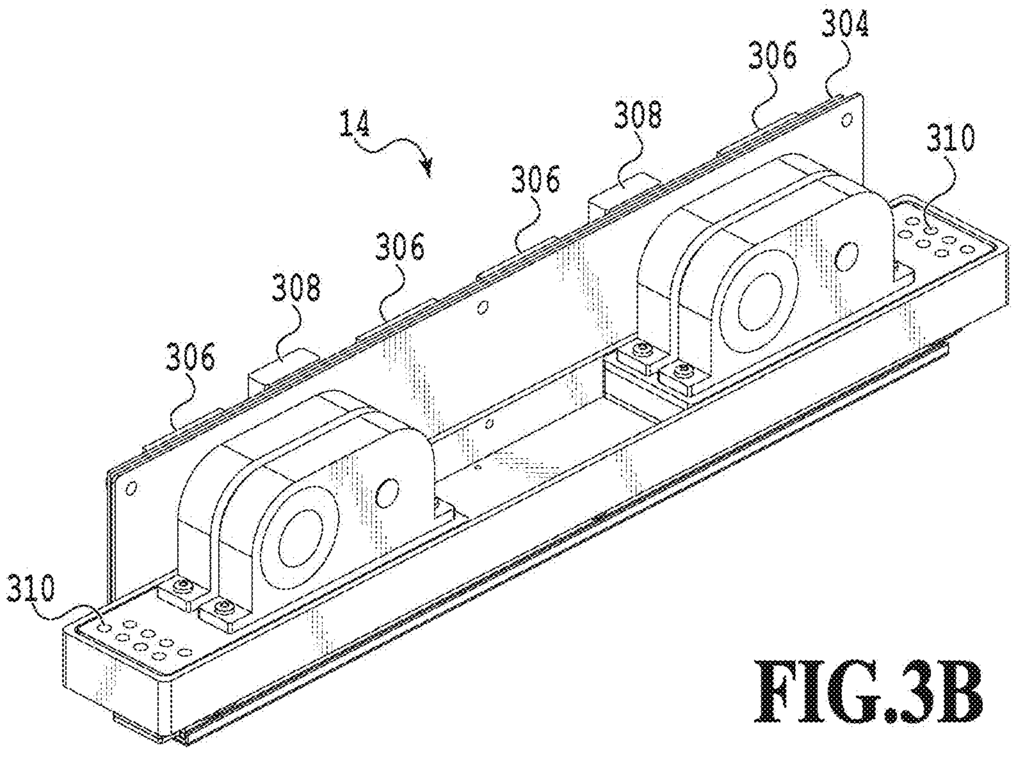
Figure 4:
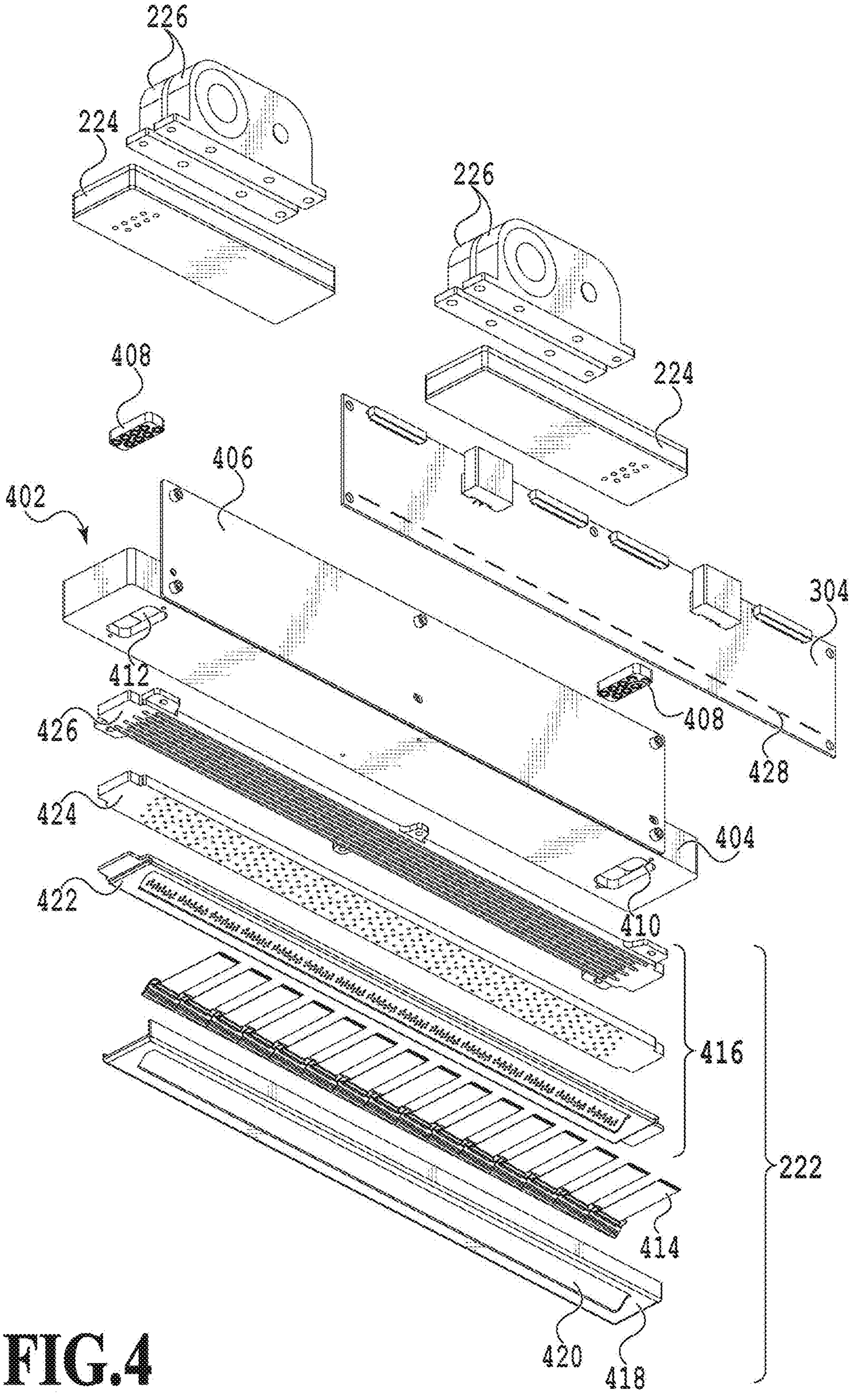
FIG. 4 is an exploded configuration diagram of the print head.

Next, an explanation is given about the configuration of the print head 14. FIG. 3A and FIG. 3B are perspective views of the print head 14, with FIG. 3A being a diagram viewed from below on one side of the conveyance direction, and FIG. 3B being a diagram viewed from above on the other side of the conveyance direction. FIG. 4 is an exploded configuration diagram of the print head 14.

In the print head 14, a plurality of printing element substrates 228 is arranged in an array along the extending direction of the print head 14 on the surface facing the print medium M conveyed in the conveyance direction by the conveyance part 12 (see FIG. 3A). In the present embodiment, the print head 14 is equipped with the 15 printing element substrates 228, and is configured so that the four types of ink, i.e., C ink, M ink, Y ink, and K ink, can be ejected from the respective printing element substrates 228.

The print head 14 includes the signal input terminals 306 and the power supply terminals 308 electrically connected to the respective printing element substrates 228 via the flexible wiring substrates 302 and the electrical wiring substrates 304 (see FIG. 3A and FIG. 3B). The signal input terminals 306 and the power supply terminals 308 are electrically connected to the electric control part (not illustrated in the drawings) of the printing apparatus 10. Each printing element substrate 228 is supplied with an ejection control signal from the electric control part via the signal input terminals 306, and is supplied with electric power required for ejection from the electric control part via the power supply terminals 308.

By consolidating the wiring with the electric circuit on the electrical wiring substrate 304, the numbers of signal input terminals 306 and power source terminals 308 are less than the number of printing element substrates 228. This reduces the number of electric connection parts that need to be removed at the time of assembling the print head 14 in the printing apparatus 10, at the time of replacing the print head 14, etc.

The print head 14 includes, near both ends in the extending direction, the connection parts 310 to be connected to the channels in the circulation paths. Ink is supplied to the print head 14 from the channels in the circulation paths provided for the respective types of ink via the corresponding connection parts 310. Further, ink is made to flow out from the print head 14 to the channels in the circulation paths provided for the respective types of ink via the corresponding connection parts 310.

The print head 14 includes the chassis 402 to which the supply units 224 and the electrical wiring substrate 304 are attached (see FIG. 4). The supply units 224 are equipped with the connection parts 310. The filters 240 (see FIG. 2A and FIG. 2B) are installed inside the supply units 224 to remove foreign substances from the ink being supplied. In the present embodiment, the print head 14 includes the two supply units 224, each of which is equipped with channels and the filters 240 for two colors. The negative pressure control units 226 are connected to the supply units 224, so that the ink supplied to the supply units 224 is supplied to the corresponding negative pressure control units 226.

Each negative pressure control unit 226 is a unit including the negative pressure adjustment mechanisms 226*a* and 226*b*, and, with the action of valves and spring members installed therein, significantly reduces pressure drop changes in the circulation paths that occur along with fluctuations in ink flow rates. Therefore, the two negative pressure adjustment mechanisms 226*a* and 226*b* are set to control pressures differing from each other, and the high-pressure side negative pressure adjustment mechanism 226*a* is connected to the common supply channel 230 of the ejection unit 222, and the low-pressure side negative pressure adjustment mechanism 226*b* is connected to the common collecting channel 232 of the ejection unit 222.

The chassis 402 includes the ejection unit support part 404 that supports the ejection unit 222 and the electrical wiring substrate support part 406 that supports the electrical wiring substrate 304, so as to ensure the rigidity of the print head 14. The electrical wiring substrate support part 406 is fixed to the ejection unit support part 404 by screws. The ejection unit support part 404 corrects warping or deformation of the ejection unit 222 and ensures the relative positional accuracy of the multiple printing element substrates 228. This reduces streaks and unevenness in printed images that are caused by the relative positional accuracy. Therefore, it is preferable that the ejection unit support part 404 has sufficient rigidity, and the favorable material may be a metal material such as SUS (Stainless Used Steel) or aluminum or a ceramic such as alumina. Further, the ejection unit support part 404 is equipped with the openings 410 and 412 to which the joint rubbers 408 are inserted. The ink supplied from the supply units 224 is guided to the third channel member 426 (described later) of the ejection unit 222 via the joint rubbers 408.

The ejection unit 222 includes the ejection modules 414 including the printing element substrates 228, and the channel member 416 that distributes the ink from the supply units 224 to the printing element substrates 228 and guides the ink flowing out from the printing element substrates 228 to the supply units 224. Further, the ejection unit 222 includes the cover member 418 that protects the periphery of the printing element substrates 228 arranged in an array.

Each ejection module 414 includes the printing element substrate 228 and the flexible wiring substrate 302, which are described in detail later. Further, the channel member 416 is configured by laminating the first channel member 422, the second channel member 424, and the third channel member 426. The channel member 416 is fixed to the ejection unit support part 404 by screws, thereby suppressing warping and deformation of the channel member 416.

The cover member 418 is a member including a frame-shaped surface where the aperture part 420 that is an opening elongated in the extending direction of the print head 14 is formed. From the aperture part 420, the printing element substrates 228 and the sealants 510 (described later) in the respective ejection modules 414 are exposed. The frame portion in the periphery of the aperture part 420 serves as a contact surface for a cap member (not illustrated in the drawings) for protecting the print head 14 during standby for printing. Thus, adhesive agent, sealant, filler, etc., are applied along the periphery of the aperture part 420 to fill in the irregularities or gaps on the surface where the printing element substrates 228 in the ejection unit 222 are exposed, so that a closed space is formed between the cap member and that surface at the time being capped.

(Ejection Module)

Figure 5A:
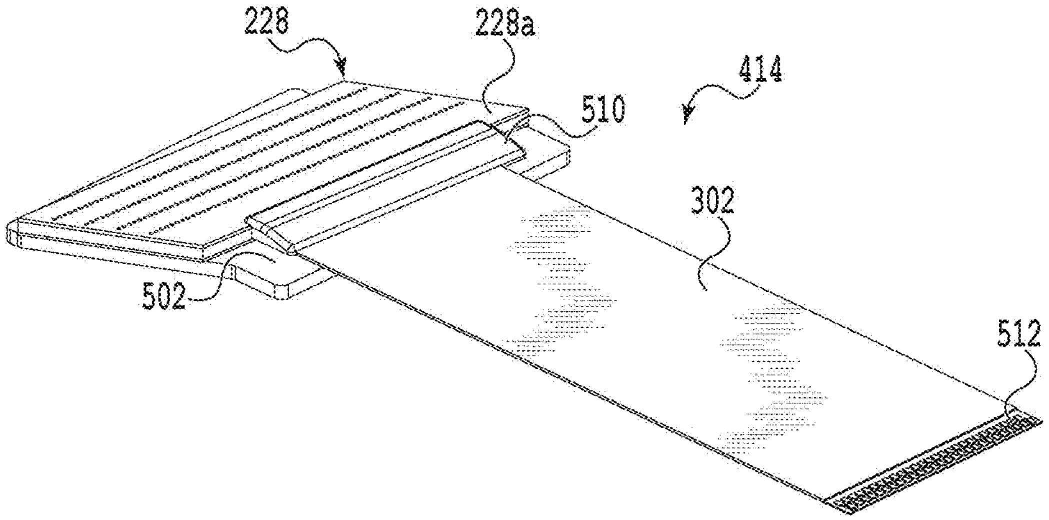
FIG. 5A and FIG. 5B are configuration diagrams of an ejection unit.
Figure 5B:
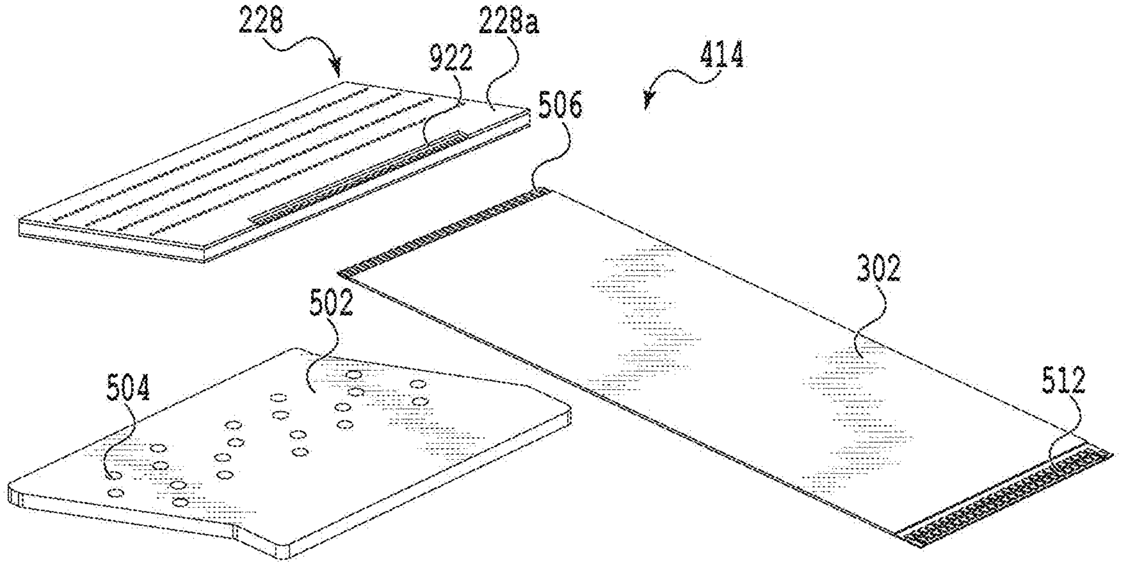

Next, an explanation is given about the ejection modules 414. FIG. 5A and FIG. 5B are schematic configuration diagrams of the ejection module 414, with FIG. 5A being a perspective view, and FIG. 5B being an exploded configuration diagram.

The ejection module 414 includes the printing element substrate 228, the flexible wiring substrate 302 that electrically connects the printing element substrate 228 and the electrical wiring substrate 304, and the support member 502 that supports the printing element substrate 228 and one end of the flexible wiring substrate 302. The support member 502 is equipped with the communication ports 504 that communicate with the openings 804 (described later) formed in the printing element substrate 228.

The printing element substrate 228 is bonded to the support member 502 at the surface opposite to the nozzle forming surface 228*a* so that the openings 804 of the printing element substrate 228 communicate with the communication ports 504. Further, the flexible wiring substrate 302 is electrically connected by wire bonding to the terminal 922 (described later) formed on the nozzle forming surface 228*a* of the printing element substrate 228, with its one end where the terminal 506 is installed being supported by the support member 502. The wire bonding portion, i.e., the electrical connection portion, is sealed with the sealant 510.

The terminal 512 is installed on the other end of the flexible wiring substrate 302, and the terminal 512 is electrically connected to the connection terminal 428 (see FIG. 4) of the electrical wiring substrate 304. The support member 502 is a support that supports the printing element substrate 228 and is also a channel member that allows the printing element substrate 228 to fluidly communicate with the channel member 416. Thus, it is preferable that the support member 502 has a high level of flatness and is made of a material that can be bonded to the printing element substrate 228 with sufficiently high reliability. Specifically, the support member 502 is made of, for example, alumina or a resin material.

(Channel Member)

Next, a detailed explanation is given about the configuration of the channel member 416.

<First Channel Member 422, Second Channel Member 424, and Third Channel Member 426>

Figure 6A:
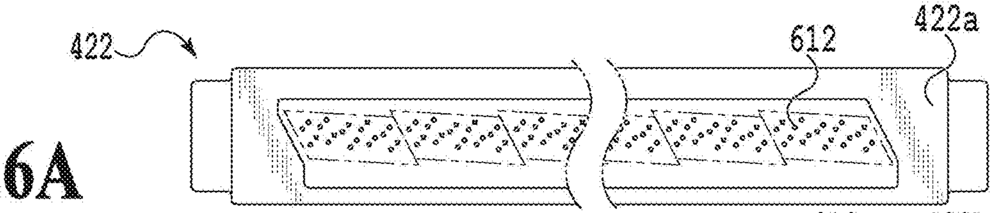
FIG. 6A to FIG. 6F are configuration diagrams illustrating a channel member.
Figure 6B:
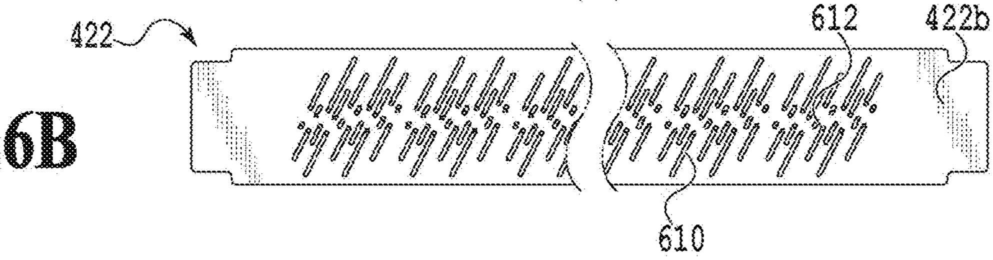
Figure 6C:
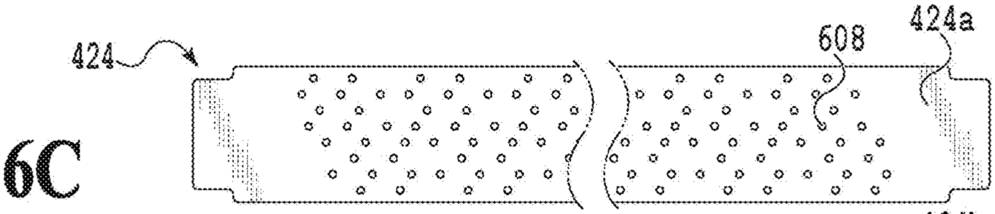
Figure 6D:
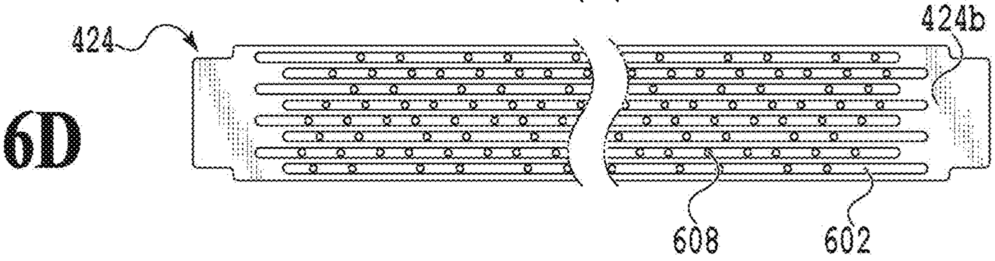
Figure 6E:
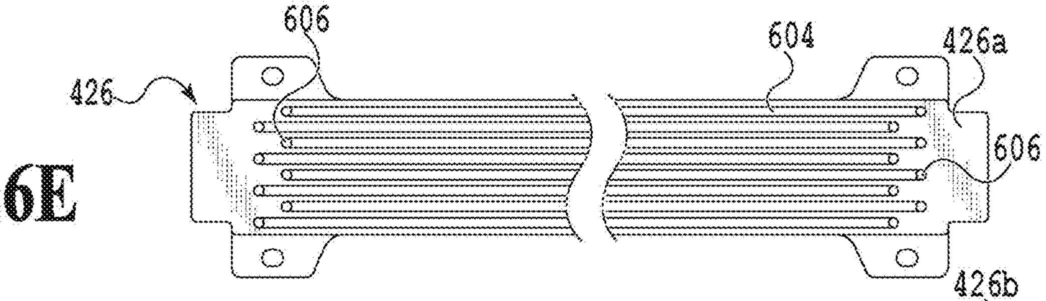
Figure 6F:
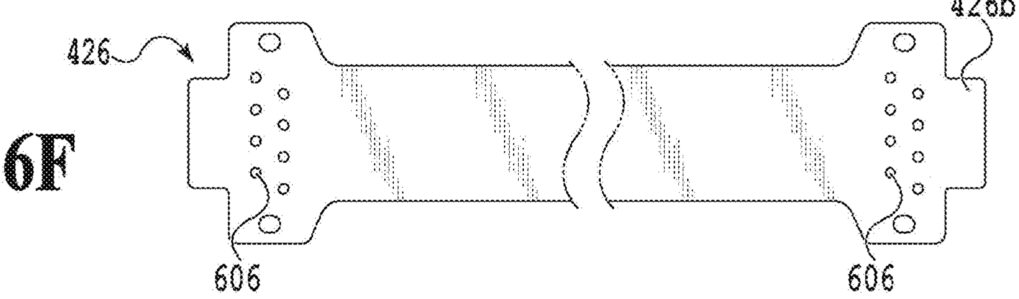

First, an explanation is given about the configurations of the first channel member 422, the second channel member 424, and the third channel member 426 in the channel member 416. FIG. 6A to FIG. 6F are configuration diagrams of the first channel member 422, the second channel member 424, and the third channel member 426. FIG. 6A is a diagram illustrating one surface 422*a* of the first channel member 422, which is a surface on which the ejection modules 414 are arranged, and FIG. 6B is a diagram illustrating the other surface 422*b* of the first channel member 422, which is a surface that is joined to one surface 424*a* of the second channel member 424. FIG. 6C is a diagram illustrating the one surface 424*a* of the second channel member 424, and FIG. 6D is a diagram illustrating the other surface 424*b* of the second channel member 424, which is a surface that is joined to one surface 426*a* of the third channel member 426. FIG. 6E is a diagram illustrating the one surface 426*a* of the third channel member 426, and FIG. 6F is a diagram illustrating the other surface 426*b* of the third channel member 426, which is a surface that abuts on the ejection unit support part 404.

A plurality of (eight in the present embodiment) common channel grooves 602 is formed on the other surface 424*b* of the second channel member 424 along the extending direction of the second channel member 424 (see FIG. 6D). Further, the common channel grooves 604 are formed on the one surface 426*a* of the third channel member 426 (see FIG. 6E). The common channel grooves 604, in a number corresponding to the respective common channel grooves 602, are installed at positions corresponding to the respective common channel grooves 602 installed on the other surface 424*b* at the time the one surface 426*a* of the third channel member 426 is joined to the other surface 424*b* of the second channel member 424. Accordingly, at the time the second channel member 424 and the third channel member 426 are joined together, eight common channels are formed by the common channel grooves 602 and the common channel grooves 604. These common channels serve as the common supply channel 230 and the common collecting channel 232 formed for each ink (see FIG. 7A and FIG. 7B).

The third channel member 426 is equipped with the communication ports 606 that penetrate from the one surface 426*a* to the other surface 426*b* (see FIG. 6E and FIG. 6F). These communication ports 606 are formed at both ends in the extending direction of the third channel member 426, and are located at both ends of each common channel groove 604 on the one surface 426*a*. Further, at the time the third channel member 426 is fixed to the ejection unit support part 404, the communication ports 606 communicate with channels (not illustrated in the drawings) formed in the joint rubber 408, thereby fluidly connecting the third channel member 426 and the supply units 224.

The second channel member 424 is equipped with the communication ports 608 that penetrate from the one surface 424*a* to the other surface 424*b* (see FIG. 6C and FIG. 6D). These communication ports 608 are formed in multiple locations in each common channel groove 602, and are formed at positions that communicate with the individual channel grooves 610 (described later) installed in the first channel member 422 at the time the second channel member 424 and the first channel member 422 are joined together.

The first channel member 422 is equipped with the individual channel grooves 610 formed on the other surface 422*b* at an angle with respect to the transverse direction of the first channel member 422 (the direction orthogonal to the extending direction of the first channel member 422) (see FIG. 6B). Further, the first channel member 422 is equipped with the communication ports 612 that penetrate from the one surface 422*a* to the other surface 422*b* (see FIG. 6A and FIG. 6B). These communication ports 612 are positioned within an area located at the center of the first channel member 422 in the transverse direction. Further, the communication ports 612 are formed at positions that fluidly communicate with the printing element substrates 228 via the communication ports 504 of the support member 502 at the time the ejection modules 414 are placed on the one surface 422*a* of the first channel member 422. Further, the communication ports 612 are located at one end of the individual channel grooves 610. The individual channel grooves 610 communicate with the communication ports 608 at the other end.

It is preferable that the first channel member 422, the second channel member 424, and the third channel member 426 are made of a material that has corrosion resistance against ink and has a low linear expansion coefficient. Specifically, the materials that can be used include composite materials (resin materials) in which alumina, LCP (liquid crystalline polymer), PPS (polyphenyl sulfide), or PSF (polysulfone) is used as a base material and inorganic fillers such as silica microparticles or fibers are added. The channel member 416 is formed by laminating the first channel member 422, the second channel member 424, and the third channel member 426 and bonding them to one another. Note that, in a case where the first channel member 422, the second channel member 424, and the third channel member 426 are made of a composite resin material, they may be joined by welding.

<Channels in the Channel Member>

Figure 7A:
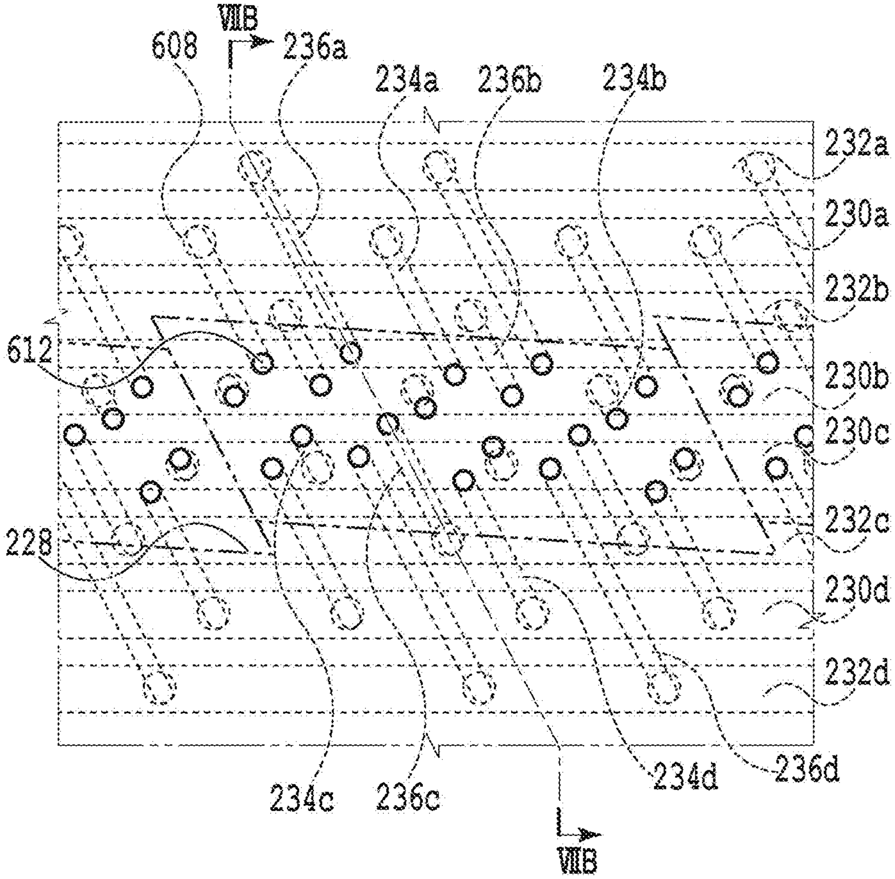
FIG. 7A and FIG. 7B are diagrams illustrating the channel configuration in the channel member.
Figure 7B:
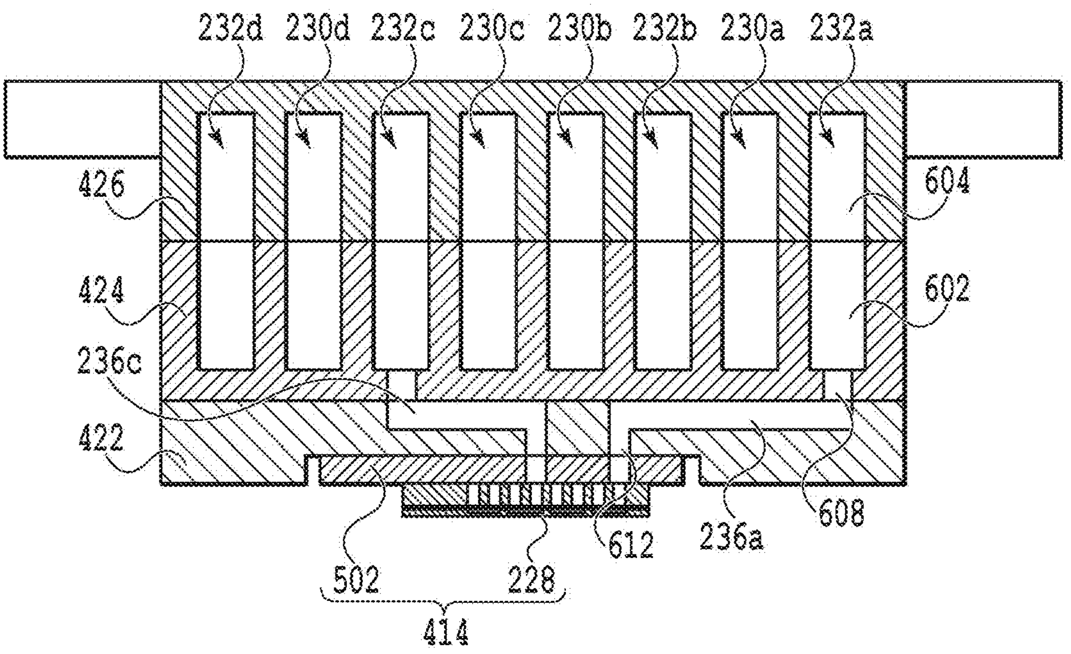

Next, an explanation is given about the channels formed in the channel member 416. FIG. 7A and FIG. 7B are diagrams illustrating channels formed in the channel member 416, with FIG. 7A being a partially enlarged view, and FIG. 7B being a cross-sectional view taken along the line VIIB-VIIB of FIG. 7A. Note that FIG. 7A is a diagram viewed from the one surface 422*a* of the first channel member 422, in which the channels formed therein are indicated by the dashed lines, and the printing element substrates 228 placed above are indicated by the dash-double-dot line.

The channel member 416 is equipped with the common supply channels 230 and the common collecting channels 232 that extend in the longitudinal direction of the print head 14 so as to correspond to the respective inks (see FIG. 7A). In FIG. 7A, the common supply channel 230*a* and the common collecting channel 232*a* correspond to the same ink, and the common supply channel 230*b* and the common collecting channel 232*b* correspond to the same ink. Further, the common supply channel 230*c* and the common collecting channel 232*c* correspond to the same ink, and the common supply channel 230*d* and the common collecting channel 232*d* correspond to the same ink.

The multiple individual supply channels 234 formed with the individual channel grooves 610 are connected to the common supply channels 230 via the communication ports 608. Specifically, the individual supply channel 234*a* is connected to the common supply channel 230*a* via the communication port 608, and the individual supply channel 234*b* is connected to the common supply channel 230*b* via the communication port 608. Further, the individual supply channel 234*c* is connected to the common supply channel 230*c* via the communication port 608, and the individual supply channel 234*d* is connected to the common supply channel 230*d* via the communication port 608.

Further, the multiple individual collecting channels 236 formed with the individual channel grooves 610 are connected to the common collecting channels 232 via the communication ports 608. Specifically, the individual collecting channel 236*a* is connected to the common collecting channel 232*a* via the communication port 608, and the individual collecting channel 236*b* is connected to the common collecting channel 232*b* via the communication port 608. Further, the individual collecting channel 236*c* is connected to the common collecting channel 232*c* via the communication port 608, and the individual collecting channel 236*d* is connected to the common collecting channel 232*d* via the communication port 608.

With this configuration, the common supply channels 230 can connect fluidly to the printing element substrates 228 arranged in the central part of the channel member 416 via the individual supply channels 234, as can the common collecting channels 232 via the individual collecting channels 236.

At the time the ejection module 414 is placed on the channel member 416, the individual collecting channels 236 communicate with the ejection module 414 via the communication ports 612 (see FIG. 7B). Note that, although illustration of a cross section is omitted, at the time the ejection module 414 is placed on the channel member 416, the individual supply channels 234 also communicate with the ejection module 414 via the communication ports 612.

Accordingly, the channel member 416 is fluidly connected to the pressure chambers 920 (described later) installed in the printing element substrate 228 via the support member 502. Note that, as described later, each pressure chamber 920 has the printing element 918 and the nozzle 802 arranged therein.

Note that the common supply channels 230 are connected to the negative pressure control units 226 (the negative pressure adjustment mechanisms 226*a*) via the supply units 224, and the common collecting channels 232 are connected to the negative pressure control units 226 (the negative pressure adjustment mechanisms 226*b*) via the supply units 224. Therefore, a pressure difference is generated between the common supply channels 230 and the common collecting channels 232 by the negative pressure control units 226. Accordingly, inside the print head 14, for each ink, part of the supplied ink flows through the common supply channel 230, the individual supply channels 234, the printing element substrates 228, the individual collecting channels 236, and the common collecting channel 232 in this order.

(Channel Configuration in the Printing Element Substrates)

Figure 8A:
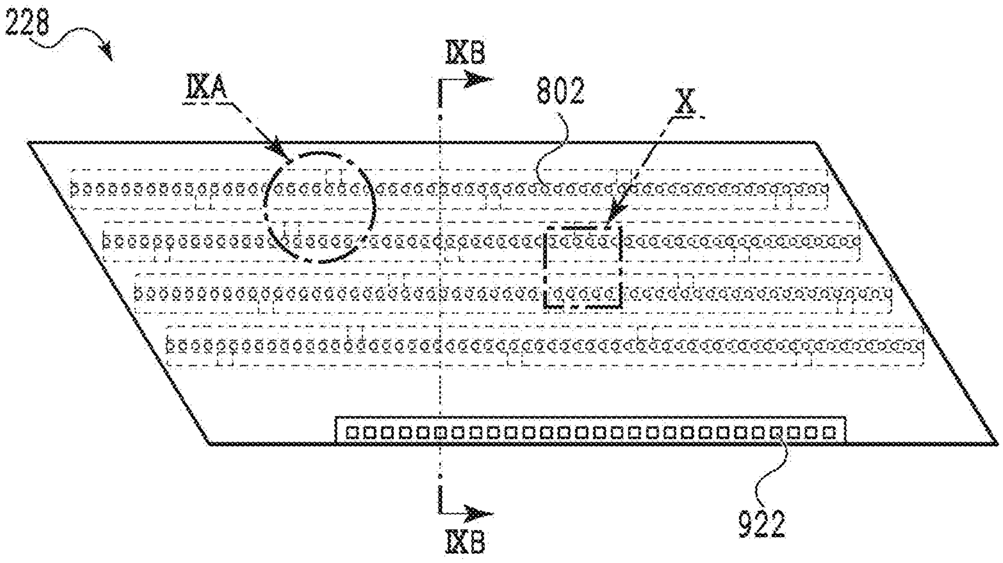
FIG. 8A and FIG. 8B are external views of a printing element substrate.
Figure 8B:
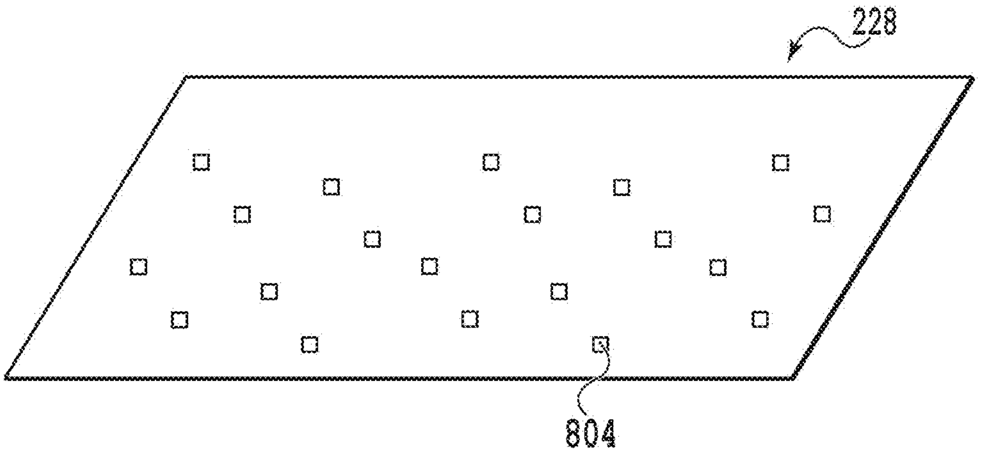
Figure 9A:
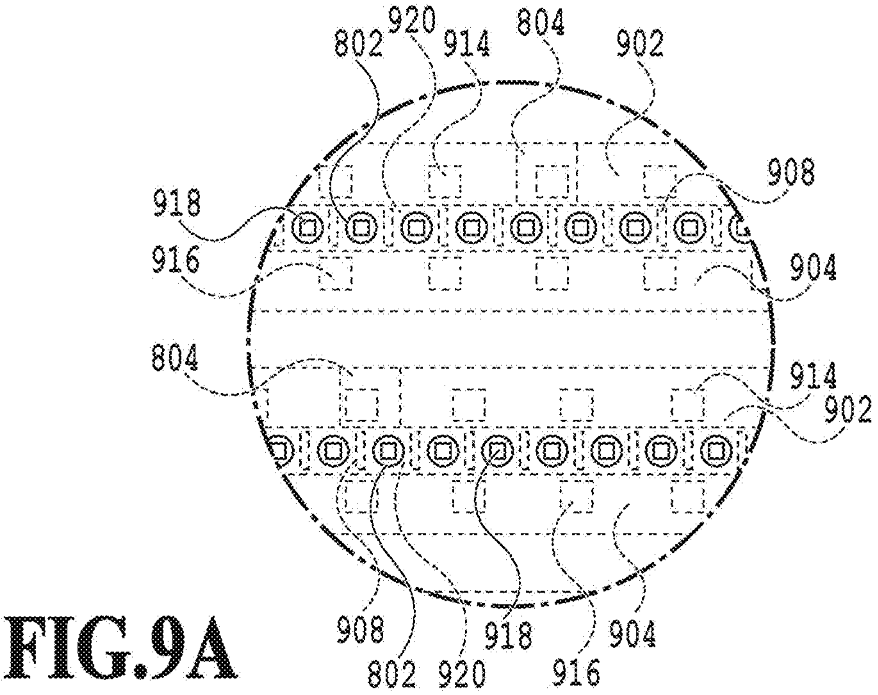
FIG. 9A and FIG. 9B are configuration diagrams of the printing element substrate.
Figure 9B:
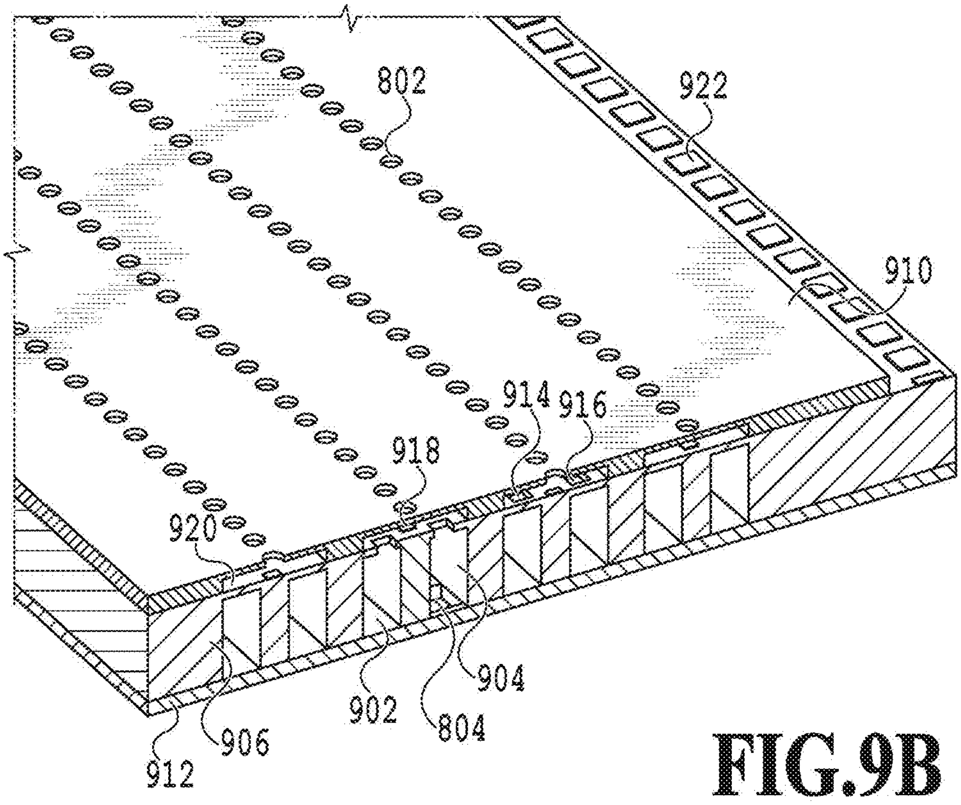
Figure 10:
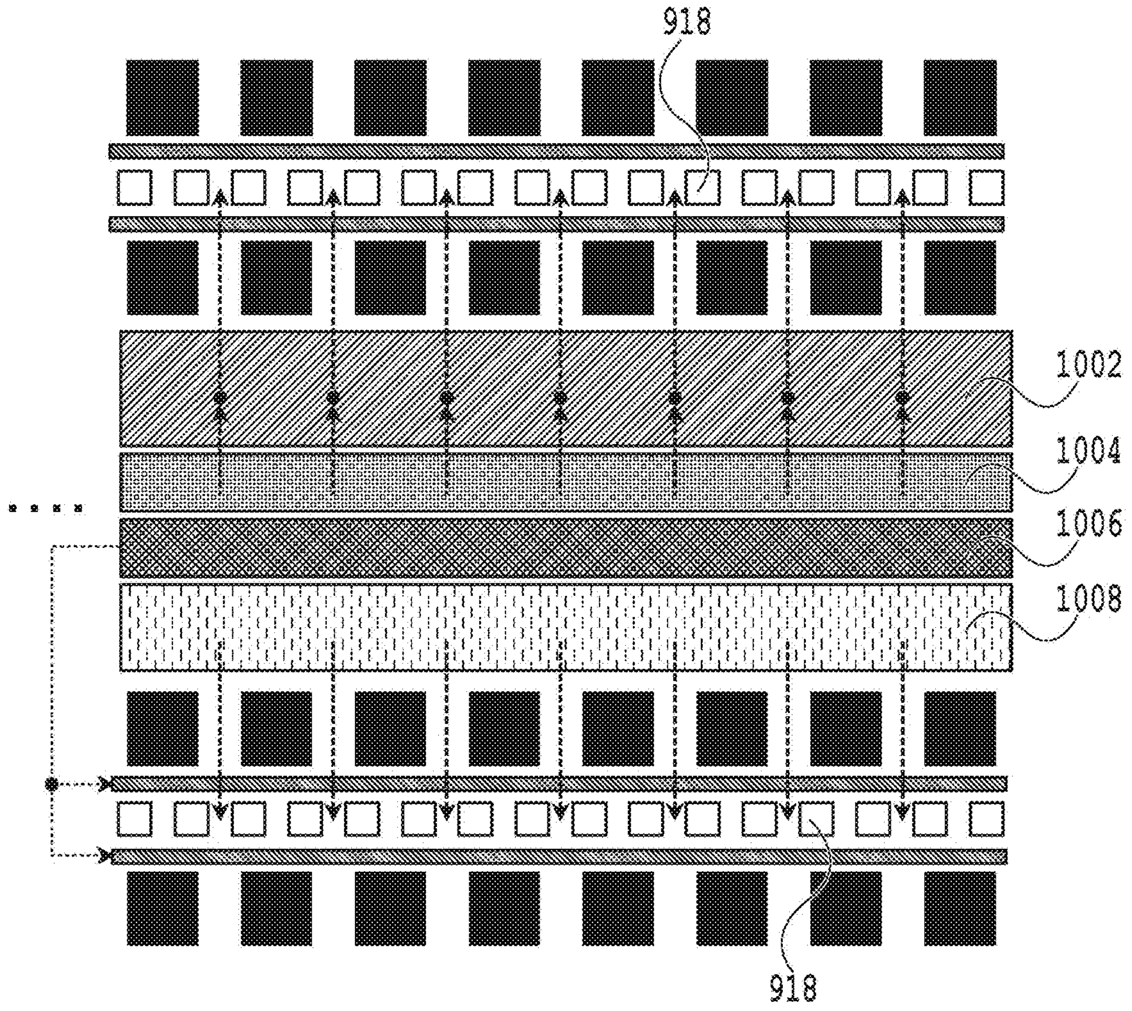
FIG. 10 is a diagram illustrating the layout of some wiring on the printing element substrate.

Next, an explanation is given about the channel configuration in the printing element substrates 228. FIG. 8A and FIG. 8B are external views of the printing element substrate 228, with FIG. 8A being a diagram viewed from the nozzle forming surface on which nozzles are formed, and FIG. 8B being a diagram viewed from an abutting surface that abuts on the support member 502. FIG. 9A and FIG. 9B are diagrams illustrating the configuration of the printing element substrate 228, with FIG. 9A being an enlarged view of the inside of the frame IXA in FIG. 8A, and FIG. 9B being a cross-sectional view taken along the line IXB-IXB in FIG. 8A. FIG. 10 is a diagram illustrating a circuit installed within the frame X in FIG. 8A.

On one surface of the printing element substrate 228, the four nozzle rows are formed to eject different inks, respectively (see FIG. 8A). Note that, in each nozzle row, a plurality of nozzles 802 is arranged in an array along the extending direction of the printing element substrate 228. Further, on the other surface opposite to the one surface, the printing element substrate 228 has the openings 804 to be fluidly connected to the communication ports 504 of the support member 502 (see FIG. 9B).

The printing element substrate 228 includes the base plate 906 in which the supply paths 902 that supply ink to the pressure chambers 920 (described later) and the collecting paths 904 that collect ink from the pressure chambers 920 (see FIG. 9B). On one surface of the base plate 906, the nozzle forming member 910 in which the nozzle rows are formed with a plurality of nozzles 802 for ejecting ink is installed. Note that the base plate 906 is made of, for example, silicon (Si), and the nozzle forming member 910 is made of, for example, a photosensitive resin. Further, the cover plate 912 is formed on the other surface opposite to the one surface of the base plate 906.

The supply paths 902 and the collecting paths 904 extend along the extending direction of the nozzle rows in the nozzle forming member 910 (see FIG. 9A). The supply paths 902 are placed on one side of the respective nozzle rows in the transverse direction of the printing element substrate 228, and the collecting paths 904 are placed on the other side of the respective nozzle rows in the transverse direction. Further, on one surface of the base plate 906, the multiple supply ports 914 that communicate with the supply paths 902 are arranged in arrays along the extending direction of the nozzle rows. Furthermore, on the other surface of the base plate 906, the multiple collecting ports 916 that communicate with the collecting paths 904 are arranged in arrays along the extending direction of the nozzle rows.

On one surface of the base plate 906, at the positions opposite to the nozzles 802, the printing elements 918 which are heating elements (electrothermal conversion elements) for generating a bubble in the ink by thermal energy are installed. That is, in the present embodiment, the printing elements 918 function as energy generating elements that generate energy for ejecting ink from the nozzles. The printing elements 918 are located within the pressure chambers 920 formed in the nozzle forming member 910. The pressure chambers 920 are formed for the respective printing elements 918 by the partitions 908. Further, one surface of the base plate 906 is equipped with the terminals 922 which are electrically connected to the printing elements 918 by electrical wiring (not illustrated in the drawings) installed on the base plate 906. Therefore, the printing elements 918 generate heat based on an ejection control signal which is input via the electrical wiring substrate 304 and the flexible wiring substrate 302, causing the ink in the pressure chambers 920 to boil. The force of bubbles generated by this boiling causes the ink in the pressure chambers 920 to be ejected from the nozzles 802.

The cover plate 912 is equipped with the openings 804 that communicate with the supply paths 902 and the collecting paths 904. Ink is supplied to the supply paths 902 through the communicating openings 804, and ink flows out to the collecting paths 904 through the communicating openings 804. In the present embodiment, each supply path 902 has three openings 804 formed therein, and each collecting path 904 has two openings 804 formed therein. The cover plate 912 also functions as a lid that forms part of the supply paths 902 and the collecting paths 904 formed in the base plate 906. The cover plate 912 is required to have sufficient corrosion resistance against ink, and, from the standpoint of preventing color mixing, high precision is required for the shape and position of the openings 804. Therefore, it is preferable to use a photosensitive resin material or a silicon plate as the material for the cover plate 912 and to form the openings 804 by a photolithography process. In this way, the cover plate 912 converts the pitch of the channels using the openings 804, and, considering the pressure loss, it is preferable that its thickness is thin, and thus the cover plate 912 is configured of, for example, a film-like material.

In the printing element substrates 228, the drive switch 1002 for driving the printing elements 918 and the selection circuit 1004 for selecting the printing elements 918 are arranged between printing element arrays in which a plurality of the printing elements 918 is arranged (see FIG. 10). Further, between the printing element arrays, there are arranged a temperature inspection diode (not illustrated in the drawings), the drive switch 1006 for driving the temperature adjustment heating elements 1204 (described later), and the selection circuit 1008 for selecting the temperature adjustment heating elements. The drive switch 1002 and the selection circuit 1004 serve as a circuit for driving the printing elements located on one side (the upper side in FIG. 10). Further, the temperature inspection diode for detecting the temperature of the printing element substrate 228 is placed between the printing element arrays. Furthermore, the drive switch 1006 and the selection circuit 1008 serve as a circuit for driving the temperature adjustment heating elements 1204 corresponding to the printing elements located on the other side (the lower side in FIG. 10).

In the printing element substrates 228, the supply paths 902 are connected to the common supply channels 230, and the collecting paths 904 are connected to the common collecting channels 232, so that a pressure difference occurs between the supply paths 902 and the collecting paths 904. While the ink is circulating in the circulation paths, this pressure difference causes the ink to flow from the supply paths 902 toward the collecting paths 904 through the supply ports 914, the pressure chambers 920, and the collecting ports 916. By this flow, for example, thickened ink, bubbles, foreign substances, and the like that have been produced by evaporation from the nozzles 802 in the nozzles 802 and pressure chambers 920 that are pausing in printing are caused to flow out to the collecting paths 904. Further, thickening of the ink in the nozzles 802 and the pressure chambers 920 can be suppressed. The ink that has flowed out into the collecting paths 904 is collected into the channel member 416 via the openings 804 of the cover plate 912 and the communication ports 504 of the support member 502.

Ink supplied to the print head 14 flows through the joint rubbers 408, the communication ports 606 in the third channel member 426, the common supply channels 230, the communication ports 608 in the second channel member 424, and the individual supply channels 234 in the first channel member 422, and flows into the communication ports 612. Thereafter, the ink flows through the communication ports 504 in the support members 502, the openings 804 in the cover plate 912, the supply paths 902 installed in the base plate 906, and the supply ports 914, and flows into the pressure chambers 920.

Of the ink supplied to the pressure chambers 920, the ink that was not ejected from the nozzles 802 flows out to the collecting ports 916 of the base plate 906, the collecting paths 904, the openings 804 in the cover plate 912, and the communication ports 504 of the support members 502. Thereafter, the ink flows out to the joint rubbers 408 through the communication ports 612 of the first channel member 422, the individual collecting channels 236, the communication ports 608 of the second channel member 424, the common collecting channels 232, and the communication ports 606 in the third channel member 426. Then, the ink flows out from the connection parts 310 formed in the supply units 224 to the outside of the print head 14.

In the first circulation path 200, the ink that has flowed in from the connection part 310 passes through the negative pressure control unit 226 and is then supplied to the joint rubber 408. In the second circulation path 250, the ink collected from the pressure chambers 920 passes through the joint rubber 408, and then flows out of the print head 14 from the connection part 310 via the negative pressure control unit 226. In the circulation paths of the present embodiment, not all of the ink that has flowed into the common supply channels 230 of the ejection unit 222 is supplied to the pressure chambers 920 via the individual supply channels 234. Some ink flows out from the common supply channels 230 to the supply units 224 without flowing into the individual supply channels 234. In this way, by installing a path for the ink to flow without passing through the printing element substrates 228, it is possible to suppress backflow of the circulatory flow of ink even in a case where the printing element substrates 228 equipped with fine channels with high flow resistance are used. Therefore, in the print head 14 according to the present embodiment, thickening of the ink in the vicinity of the pressure chambers 920 and the nozzles 802 can be suppressed, and thus deviation from the normal ejection direction and ink non-ejection can be suppressed, enabling high-quality printing.

(Positional Relationship Between Printing Element Substrates)

Figure 11:
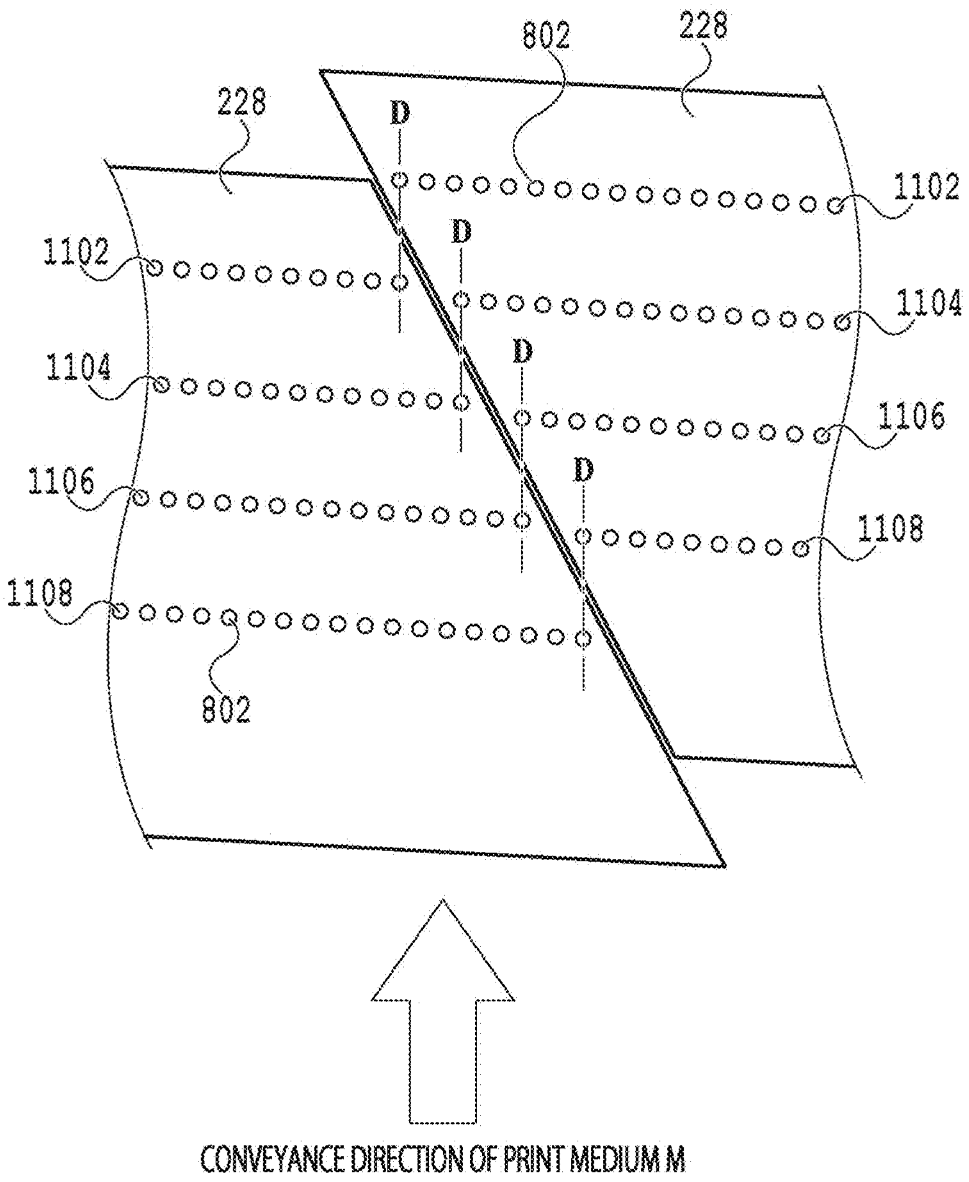
FIG. 11 is a diagram for explaining the arrangement of adjacent printing element substrates.

Next, an explanation is given about the positional relationship between adjacent printing element substrates 228 among the multiple printing element substrates 228 arranged in an array in the extending direction of the print head 14. FIG. 11 is a diagram illustrating the positional relationship between adjacent printing element substrates 228.

The printing element substrates 228 are formed in a substantially parallelogram shape (see FIG. 8A), and each of the nozzle rows 1102, 1104, 1106, and 1108 is arranged so as to be inclined at a predetermined angle with respect to the conveyance direction of the print medium M. Furthermore, the corresponding nozzle rows of adjacent printing element substrates 228 are arranged so that one nozzle overlaps with each other in the conveyance direction of the print medium M (see the dash-dot lines D in FIG. 11). The number of overlapping nozzles in the conveyance direction is not limited to one, and may be multiple.

By arranging adjacent printing element substrates 228 in this manner, even if the position of the printing element substrates 228 is slightly shifted from the predetermined position, the drive control of the overlapping nozzles makes it possible to make black streaks or blank areas that appear in the printed images difficult to be visually perceived. In a case where the printing element substrates 228 are arranged in a straight line (in-line) instead of staggered arrangement, the arrangement illustrated in FIG. 11 can be adopted. Note that, in the present embodiment, the printing element substrates 228 are formed in an approximately parallelogram shape, but there is not a limitation as such, and the printing element substrates 228 may be, for example, a quadrangle shape with a long side and a short side, such as a rectangle or a trapezoid, or any of various known shapes.

(Configuration in the Vicinity of the Heat Applying Parts on the Printing Element Substrates)

Figure 12A:
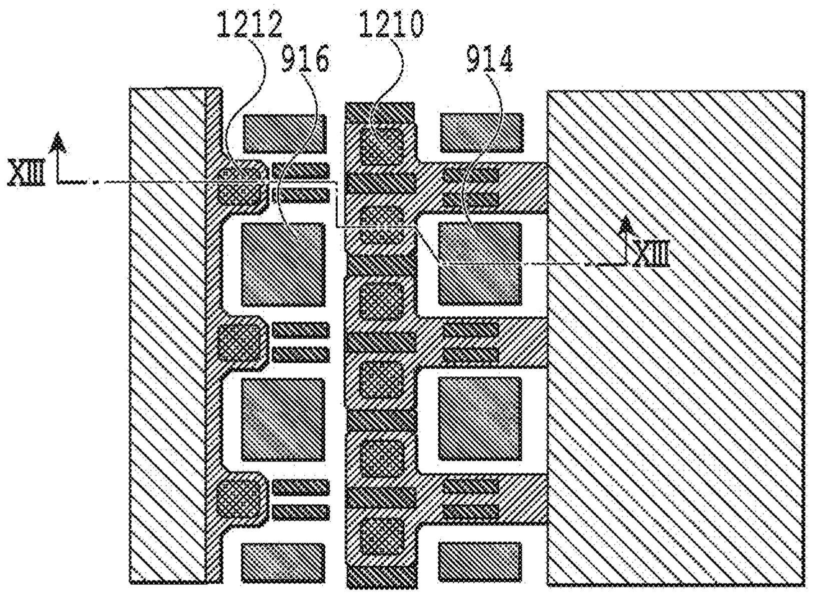
FIG. 12A and FIG. 12B are configuration diagrams of the printing element substrate.
Figure 12B:
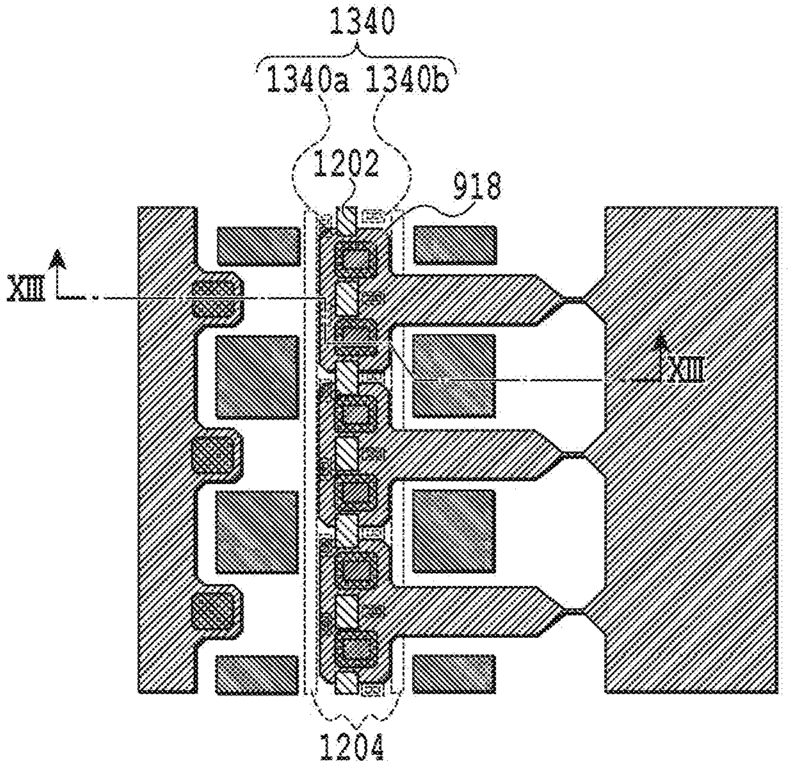
Figure 13:
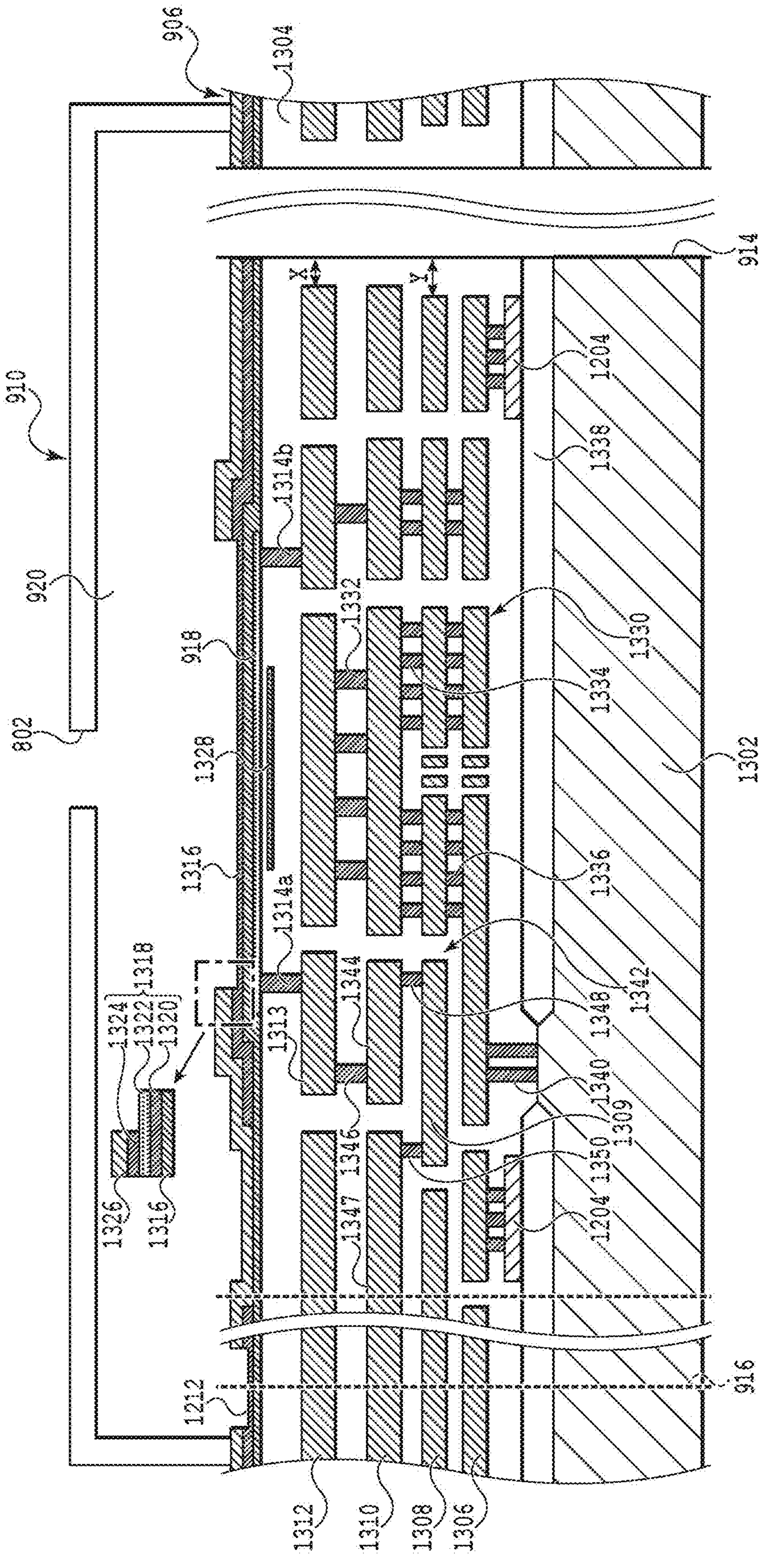
FIG. 13 is a cross-sectional configuration diagram of the printing element substrate.

Next, an explanation is given about the configuration in the vicinity of the printing elements 918, which are the heat applying parts of the printing element substrates 228. FIG. 12A and FIG. 12B are diagrams illustrating the configuration in the vicinity of the printing elements 918 on the printing element substrates 228. FIG. 12A is a diagram illustrating the configuration inside the pressure chambers 920. FIG. 12B is a diagram illustrating part of the configuration laminated on one surface of the base plate 906 on which the nozzle forming member 910 is formed. FIG. 13 is a cross-sectional diagram of the line XIII-XIII of FIG. 12A.

<Laminated Configurations on the Substrate Surface>

In the printing element substrates 228, the base plate 906 on which the nozzle forming member 910 is laminated is formed by laminating configurations such as wiring and the printing elements 918 on the base 1302 (see FIG. 13). In the present embodiment, the insulating heat storage layer 1304 made of a thermal oxide film, a SiO film, a SiN film, or the like is formed on the base 1302 (on the base). The multiple wiring layers 1306, 1308, 1310, and 1312 (four layers in the present embodiment) are formed in the heat storage layer 1304, and each wiring layer is connected with a heat transfer member. Each wiring layer is made of a metal material such as Al, Al—Si, or Al—Cu, and the heat transfer member is mainly made of tungsten or the like.

The wiring layer 1310 includes power source (VH) wiring for driving the printing elements 918, and the wiring layer 1312 is used as GND (GNDH) wiring for the VH. The wiring layer 1308 is mainly used as connection wiring for driving logics, and the wiring layer 1306 is used as power source wiring for driving logics. For example, the wiring layers 1310 and 1312 are formed with the same film thickness, the wiring layer 1308 is formed with a film thickness smaller than the wiring layers 1310 and 1312, and the wiring layer 1306 is formed with a film thickness equal to or smaller than the wiring layer 1308. The wiring layers are insulated from each other by the heat storage layer 1304 and are electrically connected only with the heat transfer member.

The printing element 918 is placed on the heat storage layer 1304. The printing element 918 is connected to the wiring layer 1312 via the heat transfer members 1314*a* and 1314*b*. The insulating protection layer 1316 is arranged on the printing element 918 and the heat storage layer 1304. The insulating protection layer 1316 is an insulating layer that covers the printing element 918 and the heat storage layer 1304. The insulating protection layer 1316 is formed of a SiO film, a SiN film, or the like.

The protective layer 1318 for blocking contact with the ink in the pressure chamber 920 is installed on the insulating protection layer 1316. This protective layer 1318 includes the lower protective layer 1320, the upper protective layer 1322, and the adhesive protective layer 1324, so as to protect the surface of the printing element 918 from chemical and physical shocks caused by heat generation from the printing element 918. In the present embodiment, the lower protective layer 1320 is made of tantalum (Ta), the upper protective layer 1322 is made of iridium (Ir), and the adhesive protective layer 1324 is made of tantalum (Ta). Therefore, the protective layer 1318 has electrical conductivity.

The protective layer 1326 is installed on the adhesive protective layer 1324 to improve ink resistance and adhesion to the nozzle forming member 910. It is preferable that the protective layer 1326 is formed of a film that is difficult to dissolve in ink, such as SiCN/SiOC. Note that, regarding the protective layer 1318, the adhesive protective layer 1324 and the protective layer 1326 are not formed in most part above the printing element 918, and the upper protective layer 1322 is exposed inside the pressure chamber 920.

The upper protective layer 1322 is formed of a material that contains a metal that dissolves into the ink in the pressure chamber 920 due to an electrochemical reaction and that does not form an oxide film that prevents the dissolution due to heating. At the time ink is ejected from the nozzle 802, the ink in the pressure chamber 920 is in contact with the surface of the upper protective layer 1322, and thus, with the driving of the printing element 918, the temperature on that surface rises instantaneously, causing cavitation in which the ink foams and then the bubbles disappear. Therefore, in the present embodiment, the upper protective layer 1322 is made of iridium, which has high corrosion resistance and reliability, and is formed so as to come into contact with the ink on the printing element 918.

<Temperature Detection Element>

The temperature detection element 1328 capable of detecting the temperature of the printing element 918 is installed in the vicinity of the printing element 918 and directly below the printing element 918. In the printing apparatus 10, the temperature detection element 1328 detects the temperature change of the printing element 918 while the printing element 918 is driven, and detects the presence or absence of ejection. The driving element 1202 (see FIG. 12B) for driving the temperature detection element 1328 is placed between adjacent printing elements 918 in the printing element array.

<Heat Dissipation Wiring Layer>

Directly below the temperature detection element 1328, the heat dissipation wiring layer 1330 for dissipating heat generated by the printing element 918 is formed (see FIG. 13). The heat dissipation wiring layer 1330 is formed by connecting the wiring layers 1306, 1308, 1310, and 1312 located directly below the temperature detection element 1328 via the heat transfer members 1332, 1334, and 1336. Note that, the members in each wiring layer that constitutes the heat dissipation wiring layer 1330 are insulated from, for example, the wiring in the corresponding wiring layer and are connected to the base 1302, and thus have the same potential as the base 1302 (mainly connected to the GND). Further, the heat dissipation wiring layer 1330 is connected to the base 1302 via the heat dissipation contact 1340 configured of a heat transfer member at the wiring layer 1306, which is located closest to the base 1302 among the wiring layers. Note that, although the background insulating layer (oxide film) 1338 is formed between the base 1302 and the heat storage layer 1304, the background insulating layer 1338 is not formed in the portion where the heat dissipation contact 1340 is connected to the base 1302. The heat generated by the printing element 918 is dissipated to the base 1302 via the heat dissipation wiring layer 1330 and the heat dissipation contact 1340. As described above, in the present embodiment, the heat dissipation wiring layer 1330 is installed directly below the printing element 918, and the heat storage layer 1304 serves as an insulating layer and functions as a heat transfer layer formed by lamination via the insulating layer. Note that, the heat dissipation wiring layer 1330 is installed directly below the printing element 918. However, there is not a limitation as such. For example, the heat dissipation wiring layer 1330 only has to be installed below the printing element 918.

<Temperature Adjustment Heating Element>

The printing element substrates 228 are equipped with the temperature adjustment heating elements 1204 capable of adjusting the temperatures of the ink flowing therein and the printing element substrate 228 (see FIG. 12B and FIG. 13). Specifically, the temperature adjustment heating elements 1204 are installed on both sides of the printing element arrays in which the printing elements 918 are arranged, so as to extend along the array direction of the printing element arrays (see FIG. 12B). The temperature adjustment heating elements 1204 generate heat while being driven, and are capable of raising the temperature of the ink flowing in the printing element substrate 228 to a desired temperature.

<Heat Dissipation Contact>

The resolution for controlling the driving of the temperature adjustment heating elements 1204 is coarser than the resolution for controlling the driving of the printing elements 918. That is, whereas the driving of each of the printing elements 918 can be controlled, the temperature adjustment heating elements 1204 are divided into groups corresponding to a plurality of printing elements 918, and the driving thereof is controlled on a group basis. Therefore, for example, if the temperature adjustment heating elements 1204 continue to be driven, the adjacent printing elements may be affected by heat more than necessary, resulting in improper ejection of ink. Further, on the printing element substrates 228, the printing elements 918 can be driven at high frequencies. Furthermore, on the printing element substrates 228, the printing elements 918 are arranged at high density (for example, 600 dpi or higher). Therefore, there is a possibility that adjacent printing elements 918 may affect each other by heat.

Therefore, in the present embodiment, as the heat dissipation contact 1340, the heat dissipation contacts 1340*a* are placed between the temperature adjustment heating element 1204 and the printing elements 918 (see FIG. 12B and FIG. 13). Further, as the heat dissipation contact 1340, the heat dissipation contacts 1340*b* are placed between adjacent printing elements in the printing element arrays (see FIG. 12B). Note that the heat dissipation contacts 1340*b* may be installed closer to the temperature adjustment heating element that does not have the heat dissipation contact 1340*a* in the space made with the printing elements 918, or may extend to the vicinity of that temperature adjustment heating element 1204.

In FIG. 13, the wiring layer 1306 extends to the rear or front side of the paper plane, and the wiring layer 1306 extending to the rear or front side and the base 1302 are connected by the heat dissipation contact 1340*b* at a position where the background insulating layer 1338 is not present. Further, the heat dissipation contacts 1340*a* and the heat dissipation contacts 1340*b* are each formed at a position that does not overlap with the printing elements 918 in the plane intersecting (orthogonally in the present embodiment) the lamination direction of the wiring layers (see FIG. 12B). That is, the heat dissipation contacts 1340*a* and 1340*b* are placed at positions not directly below the printing elements 918.

As described above, in the present embodiment, by installing the heat dissipation contacts 1340*a* between the printing elements 918 and the temperature adjustment heating element 1204, which serve as heat sources, not only the heat generated by the printing elements, but also the heat generated by the temperature v heating elements located nearby can be dissipated to the base 1302. Further, by installing the heat dissipation contacts 1340*b* between adjacent printing elements 918, heat can be dissipated to the base 1302 not only from the printing elements 918 connected via the heat dissipation wiring layers 1330, but also from the adjacent printing elements 918.

<Distance Between Each Wiring Layer and the Supply Ports>

Incidentally, ink is supplied from the supply ports 914 to the pressure chambers 920, and the ink is collected to the collecting ports 916. Therefore, while the ink circulates in the circulation paths, the ink flows from the supply port 914 side to the collecting port 916 side. Since the ink may dissolve the interlayer insulating films, each wiring layer is installed at a certain distance from the supply ports 914. This prevents short circuits between the ink and the wiring. Note that the wiring layers 1310 and 1312 and the wiring layers 1306 and 1308 are different in distance from the supply ports 914, with the wiring layers 1310 and 1312 (see the distance X in FIG. 13) being closer than the wiring layers 1306 and 1308 (see the distance Y in FIG. 13). This is to detect a VH leak, which occurs with high probability if a short circuit occurs between the wiring layers 1310 and 1312 and the ink, at an early stage and to prevent a breakdown of the printing apparatus.

<Propagation Retardation Part>

The heat transfer members 1314*a* and 1314*b* connected to the printing elements 918 may be destroyed if an excessive voltage or current is applied thereto. In particular, the heat transfer member 1314*a* side (the positive power source side) to which the printing element power source voltage VH is applied is often destroyed because a current flows therethrough first. If the heat transfer member 1314*a* is destroyed, ink comes into contact with the destroyed heat transfer member 1314*a*, or even with the wiring layer 1312 if the destruction is severe.

If link comes into contact with the heat transfer members 1314*a* or the wiring layer 1312 due to the destruction, the ink will cause corrosion to progress since the printing element power source voltage VH is applied thereto. Then, eventually, the corrosion will progress to the wiring layer 1310 which is commonly connected to all of the printing elements 918, and thus there is a possibility that a break in one of the printing elements 918 will cause all of the printing elements 918 to become unusable.

Therefore, in the present embodiment, the printing element substrates 228 are equipped with the propagation retardation parts 1342 for retarding the propagation of corrosion in the printing elements 918 caused by ink to the wiring layer 1310 at the time the wiring is broken. The propagation retardation part 1342 is configured so that corrosion of the wiring caused by ink that has invaded through a wire break portion propagates from the wiring layer 1312 through each heat transfer member to the wiring layer 1308 once, and then gets connected to the power source wiring of the wiring layer 1310. That is, the printing element substrate 228 is connected to the wiring layer 1310, which is the power source wiring, via the propagation retardation part 1342 formed so as to detour in the lamination direction of each wiring layer.

Specifically, in the propagation retardation part 1342, the heat transfer member 1314 connected to the printing element 918 is connected to the member 1313 of the wiring layer 1312. Further, the member 1313 is connected to the member 1344 of the wiring layer 1310 via the heat transfer member 1346. Furthermore, the member 1344 is connected to the member 1309 of the wiring layer 1308 via the heat transfer member 1348. Moreover, the member 1309 is connected the wiring part (the power source wiring) 1347 that is connected to the power source of the wiring layer 1310 via the heat transfer member 1350. Note that the members in each wiring layer constituting the propagation retardation part 1342 are insulated from the wiring in the corresponding wiring layer. Accordingly, corrosion does not propagate directly from the members of wiring layer 1312 to the wiring part 1347, but detours from the member 1313 of the wiring layer 1312 through the member 1344 to the member 1309 of the wiring layer 1308 and then reaches the wiring part 1347 of the wiring layer 1310. As described above, in the present embodiment, the propagation retardation part 1342 is formed by the lamination on the base 1302 via the heat storage layer 1304, and functions as a heat transfer layer that connects the printing element 918 and the wiring layer 1310.

Furthermore, in the propagation retardation part 1342, the connection positions between the members of the respective layers via the heat transfer members are located at or in the vicinity of the ends of the members. The vicinity of the ends is, for example, a position within 5 μm from the ends. This ensures the length of the path along which the corrosion propagates, so that the time period for the corrosion to reach the wiring layer 1310 is increased, thereby extending the lifetime of the printing element substrates 228. With this configuration, even if a particular printing element breaks down, the particular printing element can be put into an ink non-discharge (non-ejection) state, thereby securing a reliable line and allowing continued use. Note that, in the present embodiment, the propagation retardation part 1342 is configured to detour to the wiring layer 1308. However, there is not a limitation as such. For example, the propagation retardation part 1342 may detour to the wiring layer 1306. In this case, the propagation retardation part 1342 and the heat dissipation contact 1340 are arranged at positions so as not to interfere with each other.

<Prevention of Kogation>

The printing element substrates 228 are configured with the ability of suppressing kogation that accumulates on the upper protective layer 1322 due to the driving of the printing elements 918. Kogation occurs if the coloring materials and additives contained in the ink are heated to high temperatures, breaking down at the molecular level and turning into difficult-to-dissolve substances, and that substances are physically adsorbed onto the surface of the upper protective layer 1322.

In the printing element substrate 228, in order to suppress kogation, the portions of the upper protective layer 1322 directly above the printing elements 918 are formed as the electrodes 1210, and the counter electrodes 1212 corresponding to the electrodes 1210 are installed in the vicinity of the collecting ports 916 (see FIG. 12A), so that electric fields are formed within the pressure chambers 920. Note that the electrodes 1210 function as negative electrodes during printing operations. This makes it possible to keep negatively charged particles such as pigments in the ink away from the surface of the electrodes 1210, i.e., away from the surface of the upper protective layer 1322 above the printing elements 918.

In this way, by reducing the presence rate of negatively charged particles (hereinafter also referred to as "negative electric potential particles") in the vicinity of the surface of the upper protective layer 1322, it is possible to suppress the accumulation of kogation on the surface of the upper protective layer 1322 above the printing elements 918 during printing operations. That is, in the printing element substrates 228, at the time the upper protective layer 1322 is heated to a high temperature, by reducing the presence rate of coloring materials, additives, etc., which cause kogation in the vicinity of the surface of the upper protective layer 1322, the occurrence of kogation is suppressed.

Figure 14D:
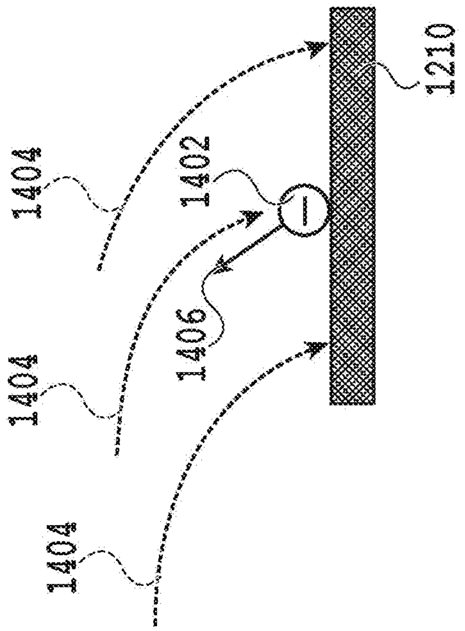
FIG. 14A to FIG. 14D are diagrams for explaining the behavior of negative electric potential particles in a pressure chamber.
Figure 14A:
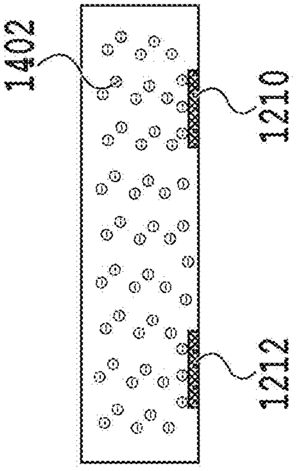

An explanation is given about the mechanism of electric field control (potential control) during kogation suppression in the present embodiment with reference to FIG. 14A to FIG. 14D. FIG. 14A to FIG. 14D are diagrams illustrating the electric field and negative electric potential particles in a potential-controlled state and in a non-potential-controlled state. In the state without potential control between the electrode 1210 and the counter electrode 1212, the negative electric potential particles 1402 in the ink in the pressure chamber 920 are dispersed approximately uniformly in the ink, as illustrated in FIG. 14A.

Figure 14B:
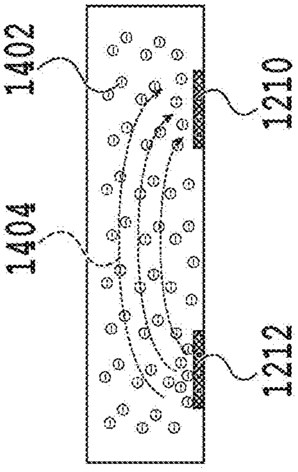

If a voltage is applied so that the potential of the electrode 1210 is relatively lower than the potential of the counter electrode 1212, the state becomes as illustrated in FIG. 14B. At this time, the potential difference between the electrode 1210 and the counter electrode 1212 is about 0.5 to 2.5V. Further, at this time, the electric field 1404 is formed between the electrode 1210 and the counter electrode 1212 via the ink, but no current flows. Furthermore, since the electrode 1210 has a negative electric potential relative to the counter electrode 1212, the negative electric potential particles 1402 are repelled from the surface of the electrode 1210, and the presence rate of the negative electric potential particles 1402 in the vicinity of the surface of the electrode 1210 decreases. The negative electric potential particles 1402 are repelled by the repulsive force 1406 received from the surface of the electrode 1210 along the line of electric force of the electric field 1404 formed in the ink (see FIG. 14D).

With this mechanism, in the present embodiment, if the potential of the counter electrodes 1212 is Vc and the potential of the electrodes 1210 is Vh, the larger the potential difference $\Delta V(=Vc-Vh)$ is, the more the negative electric potential particles 1402 that cause kogation are repelled from the electrodes 1210, making it less likely that kogation will occur on the electrodes 1210. Regarding the kogation adhering to the electrodes 1210, i.e., the kogation adhering in the vicinity of the surface of the upper protective layer 1322, a voltage is applied between the electrodes 1210 and the counter electrodes 1212 to cause the surface part of the upper protective layer 1322 to dissolve into ink, thereby lifting off the kogation for removal. At this time, a voltage of 3V or more is applied between the electrodes 1210 and the counter electrodes 1212 so that iridium, which is the material for the electrodes, dissolves. Further, at this time, it is preferable to apply the voltage to the electrodes 1210 while determining the orientation of the voltage. By removing the kogation in this manner, the surface of the electrodes 1210 is left almost free of kogation.

Figure 14C:
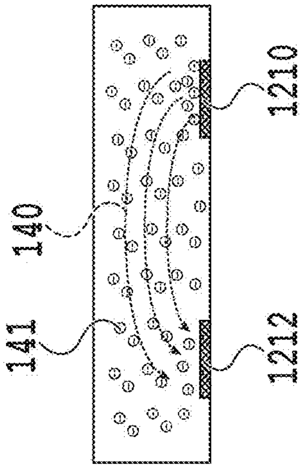

Note that, if ink is ejected in a state where there is almost no kogation on the upper protective layer 1322 after removal of kogation, noticeable kogation occurs on the upper protective layer 1322. Therefore, within a predetermined time period immediately after removal of kogation, the ejection characteristics change significantly. Thus, after removal of kogation, an aging treatment is performed to cause an appropriate amount of kogation to adhere to the upper protective layer 1322. In this case, the electric field is controlled so that negative electrically-charged particles gather on the upper protective layer 1322 as illustrated in FIG. 14C.

(Functional Effect)

As explained above, in each printing element substrate, heat dissipation contacts for dissipating heat from the heat dissipation wiring layer, which is installed directly below a temperature detection element, to the base are installed between a temperature adjustment heating element and the printing element and between adjacent printing elements. This makes it possible to perform pinpoint heat dissipation at locations where high heat dissipation efficiency is required. Therefore, it is possible to reduce the area occupied by the heat dissipation contacts, which contributes to the downsizing and an increase in density of the printing element substrates.

Further, in each printing element substrate, the printing elements are connected to the wiring part that is connected to the power source in a manner detouring in the lamination direction of the wiring layers using the propagation retardation part. Accordingly, even if a wire break occurs between a printing element and the propagation retardation part, the distance from the wire break portion to the wiring part is longer, and thus the time period for corrosion caused by ink to reach the wiring part is longer. Therefore, even if a particular printing element becomes unable to eject ink due to a wire break, the printing element substrate can continue to be used by ejecting ink from other nozzles instead of ejecting ink from the nozzle corresponding to that printing element.

(Other Embodiments)

Note that the above-described embodiment may be modified as shown in the following (1) through (5).

(1) In the above-described embodiment, the heat dissipation contacts 1340*a* are arranged between the respective printing elements 918 and the temperature adjustment heating element 1204 in a one-to-one relationship with the printing elements 918. However, there is no limitation as such. For example, one heat dissipation contact 1340*a* may be arranged for multiple printing elements 918. Further, although not specifically described in the above embodiment, the heat dissipation contacts 1340*b* corresponding to the printing elements 918 located at both ends of the printing element arrays are installed, for example, outside the printing element arrays. Furthermore, in the above-described embodiment, the heat dissipation contacts 1340*b* are arranged between adjacent printing elements 918, and one heat dissipation contact 1340*b* corresponds to one printing element 918. However, there is no limitation as such. For example, the heat dissipation contacts 1340*b* may be arranged between every other adjacent printing element 918. In this case, one heat dissipation contact 1340*b* corresponds to two printing elements 918.

Figure 15:
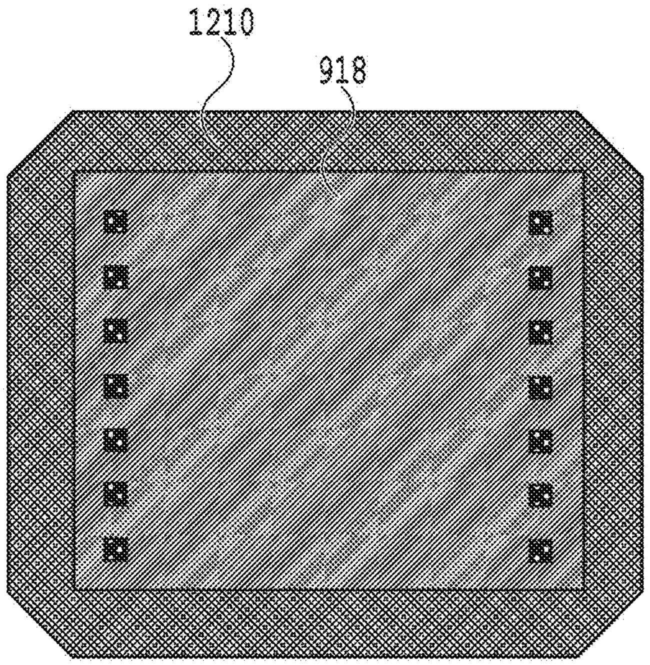
FIG. 15 is a diagram illustrating a modification example of an electrode.

(2) In the above-described embodiment, the exposed area of the upper protective layer 1322 to the pressure chambers 920, i.e., the area of the electrodes 1210, is smaller than the area of the upper surface of the printing elements 918. However, there is not a limitation as such. For example, as illustrated in FIG. 15, the electrodes 1210 may be exposed to the pressure chambers 920 in an area larger than the area of the upper surface of the printing elements 918, i.e., the area that contributes to the bubble generation of ink. For example, if the size of the printing elements 918 is 15 μm×20 μm, the electrodes 1210 have the size of 19 μm×24 μm and are formed with the four corners chamfered.

(3) Although not specifically described in the above embodiment, in the process of removing kogation, the voltage applied between the electrodes 1210 and the counter electrodes 1212 may be reversed, and thus not only the electrodes 1210 but also the counter electrodes 1212 dissolve and reduce. The counter electrodes 1212 are arranged in the vicinity of the collecting ports 916 and have a size of, for example, 20 μm×20 μm, so as not to come into contact with the configurations used to eject ink from the nozzles, such as the printing elements 918. Further, although not specifically described in the above embodiment, the temperature adjustment heating elements 1204 are made of, for example, POL (polysilicon) or AL (aluminum). Note that the temperature adjustment heating elements 1204 may have the same configuration as the printing elements 918.

(4) The above-described embodiment is not only applied to a printing apparatus that performs printing on a print medium by ejecting ink, but can be applied to various liquid ejection apparatuses that obtain a product by ejecting liquid. Further, in the above-described embodiment, the printing apparatus 10 is what is termed as a full-line type printing apparatus that uses a long print head that covers the whole area in the width direction of the printing area on the print medium. However, there is not a limitation as such. It is also possible to use what is termed as a serial scan type printing apparatus, which uses a print head that ejects ink while moving in a direction intersecting the conveyance direction of the print medium.

(5) The above-described embodiment and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-164214, filed Sep. 27, 2023, which is hereby incorporated by reference wherein in its entirety.

What is claimed is:

1. A liquid ejection head substrate capable of ejecting liquid using energy generated by an energy generating element, the liquid ejection head substrate comprising:

a base;

a first heat transfer layer configured to be installed below the energy generating element, and formed by being laminated on the base via an insulating layer;

a temperature adjustment heating element configured to be capable of adjusting the temperatures of the liquid and the liquid ejection head substrate; and a first heat transfer member configured to connect the first heat transfer layer and the base, wherein the first heat transfer member is installed between adjacent ones of a plurality of the energy generating elements and between the energy generating element and the temperature adjustment heating element.

2. The liquid ejection head substrate according to claim 1, wherein the first heat transfer member does not overlap with the energy generating element in a plane intersecting an lamination direction of the first heat transfer layer.

3. The liquid ejection head substrate according to claim 1 further comprising a temperature detection element configured to be capable of detecting the temperature of the energy generating element between the energy generating element and the first heat transfer layer.

4. The liquid ejection head substrate according to claim 1 further comprising a second heat transfer layer formed by being laminated on the base via the insulating layer, and configured to connect the energy generating element and a power source wiring, wherein the second heat transfer layer detours in an lamination direction of the second heat transfer layer to connect the energy generating element and the power source wiring.

5. The liquid ejection head substrate according to claim 4, wherein an interlayer of the second heat transfer layer is connected via a second heat transfer member, and wherein the second heat transfer member connects the interlayer at or in the vicinity of an end in a plane intersecting the lamination direction.

6. The liquid ejection head substrate according to claim 5, wherein the second heat transfer member connects the interlayer within 5 μm from the end.

7. The liquid ejection head substrate according to claim 1, wherein the plurality of the energy generating elements is arranged in an array in a predetermined direction, wherein the temperature adjustment heating element is installed at both ends of the array of the energy generating elements along the predetermined direction, and wherein a resolution for controlling the driving of the temperature adjustment heating elements is coarser than a resolution for controlling the driving of the energy generating elements.

8. The liquid ejection head substrate according to claim 7, wherein a drive element that drives the temperature adjustment heating element is placed between adjacent ones of the plurality of the energy generating elements.

9. The liquid ejection head substrate according to claim 8, wherein the first heat transfer member is installed between the energy generating element and the temperature adjustment heating element installed on one side of an array of the energy generating elements, and between adjacent ones of the plurality of the energy generating elements.

10. The liquid ejection head substrate according to claim 9, wherein the first heat transfer member installed between adjacent ones of the plurality of the energy generating elements extends to near the temperature adjustment heating element installed on the other side of an array of the energy generating elements, or is installed closer to the temperature adjustment heating element installed on the other side of the array of the energy generating elements.

11. The liquid ejection head substrate according to claim 10, wherein the first heat transfer member is installed for the energy generating element in a one-to-one manner between adjacent ones of the plurality of the energy generating elements.

12. The liquid ejection head substrate according to claim 10, wherein the first heat transfer member is installed for the energy generating elements in a one-to-two manner between adjacent ones of the plurality of the energy generating elements.

13. The liquid ejection head substrate according to claim 9, wherein the first heat transfer member is installed for the energy generating element in a one-to-one manner on the one side of the array of the energy generating elements.

14. The liquid ejection head substrate according to claim 9, wherein the first heat transfer member is installed for the energy generating elements in a one-to-many manner on the one side of the array of the energy generating elements.

15. A liquid ejection head including a liquid ejection head substrate capable of ejecting liquid using energy generated by an energy generating element, the liquid ejection head substrate comprising: a base; a first heat transfer layer configured to be installed below the energy generating element, and formed by being laminated on the base via an insulating layer; a temperature adjustment heating element configured to be capable of adjusting the temperatures of the liquid and the liquid ejection head substrate; and a first heat transfer member configured to connect the first heat transfer layer and the base, wherein the first heat transfer member is installed between adjacent ones of a plurality of the energy generating elements and between the energy generating element and the temperature adjustment heating element.

16. The liquid ejection head according to claim 15, wherein the liquid ejection head substrate has a quadrangle shape with a long side and a short side.

17. The liquid ejection head according to claim 15, wherein a plurality of the liquid ejection head substrates is arranged in an array in a predetermined direction.

18. A liquid ejection apparatus including a liquid ejection head equipped with a liquid ejection head substrate capable of ejecting liquid using energy generated by an energy generating element, the liquid ejection head substrate comprising: a base; a first heat transfer layer configured to be installed below the energy generating element, and formed by being laminated on the base via an insulating layer; a temperature adjustment heating element configured to be capable of adjusting the temperatures of the liquid and the liquid ejection head substrate; and a first heat transfer member configured to connect the first heat transfer layer and the base, wherein the first heat transfer member is installed between adjacent ones of a plurality of the energy generating elements and between the energy generating element and the temperature adjustment heating element.

19. The liquid ejection apparatus according to claim 18 further comprising a circulation path configured to supply the liquid to the liquid ejection head substrate and collect the liquid from the liquid ejection head substrate, so as to be capable of circulating the liquid.

* * * * *